United States Patent [19]

Sudo et al.

[11] Patent Number: 5,612,709

[45] Date of Patent: Mar. 18, 1997

[54] MULTI-EYE IMAGE DISPLAYING APPARATUS

[75] Inventors: Toshiyuki Sudo, Kawasaki; Susumu Matsumura, Kawaguchi; Naosato Taniguchi; Yoko Yoshinaga, both of Machida; Shin Kobayashi, Atsugi; Hideki Morishima, Tokyo; Tadashi Kaneko, Isehara, all of Japan

[73] Assignee: Canon Kabushiki Kaisha, Tokyo, Japan

[21] Appl. No.: 648,617

[22] Filed: May 16, 1996

Related U.S. Application Data

[63] Continuation of Ser. No. 218,927, Mar. 25, 1994, abandoned.

[30] Foreign Application Priority Data

Mar. 26, 1993 [JP] Japan ................................. 5-092113

[51] Int. Cl.$^6$ ........................................................ G09G 5/00
[52] U.S. Cl. ........................................ 345/8; 345/7; 359/462
[58] Field of Search ........................ 345/7, 8, 9; 359/462, 359/477, 473, 476

[56] References Cited

U.S. PATENT DOCUMENTS

| | | | |
|---|---|---|---|
| 2,326,951 | 8/1943 | Köber et al. | 359/462 |
| 4,984,179 | 1/1991 | Waldern | 345/8 |
| 4,994,794 | 2/1991 | Price et al. | 345/7 |
| 5,003,300 | 3/1991 | Wells | 345/8 |
| 5,125,733 | 6/1992 | Lee | 359/477 |
| 5,309,169 | 5/1994 | Lippert | 345/7 |

FOREIGN PATENT DOCUMENTS

| | | | |
|---|---|---|---|
| 0344881A2 | 12/1989 | European Pat. Off. | |
| 0488723A2 | 6/1992 | European Pat. Off. | |
| 0515175A2 | 11/1992 | European Pat. Off. | |
| 0576160 | 12/1993 | European Pat. Off. | 345/7 |
| 6123852 | 5/1994 | Japan | 345/8 |
| 2134298 | 8/1984 | United Kingdom | 345/8 |
| 2155199 | 9/1985 | United Kingdom | 359/473 |
| 9401798 | 1/1994 | WIPO | 345/8 |
| 9411855 | 5/1994 | WIPO | 345/7 |

OTHER PUBLICATIONS

IBM Technical Disclosure Bulletin "LED Optical Deflection Display" by Y. Asada, vol. 21, No. 10, Mar. 1979.

*Primary Examiner*—Mark R. Powell
*Assistant Examiner*—Matthew Luu
*Attorney, Agent, or Firm*—Morgan & Finnegan LLP

[57] ABSTRACT

The present invention relates to a multi-eye image displaying apparatus and a method using this apparatus. The apparatus comprises an image displaying element, provided for each of right and left eyes and a virtual image moving element for moving at least one of the virtual images for the right and left eyes in a horizontal direction. The image displaying element has an illuminating element for emitting light and, a display unit for displaying an image by using the light from the illuminating element. The image displaying element also has an optical system for projecting the light from the display unit toward a pupil of a viewer and, as a result, forming virtual images of the image to be displayed on the display unit in front of the pupil.

12 Claims, 22 Drawing Sheets

IMAGE FOR LEFT EYE

IMAGE FOR RIGHT EYE

OBSERVABLE VIRTUAL IMAGE

IMAGE FOR LEFT EYE

IMAGE FOR RIGHT EYE

OBSERVABLE IMAGE

IMAGE FOR LEFT EYE     IMAGE FOR RIGHT EYE

OBSERVABLE VIRTUAL IMAGE 5,612,709

MULTI-EYE IMAGE DISPLAYING APPARATUS

This is a continuation of application Ser. No. 08/218,927, filed on Mar. 25, 1994, now abandoned

BACKGROUND OF THE INVENTION

1. Field of the Invention

The present invention relates to a multi-eye image displaying apparatus for magnifying image data of a small-sized displaying element such as, e.g., a liquid crystal display element, a CRT, etc., imaging and displaying the image data as virtual images in front of a viewer.

2. Related Background Art

A conventional displaying apparatus provides the image data in the form of photos, a TV and a movie or the like. Along development of the scientific technology, the displaying apparatus has hitherto been constructed to give a wider view angle and a higher performance of a fine display. For instance, a high-vision (high-definition) TV has a specification to increase the number of scanning lines than a conventional color TV and to provide an image full of presence with a scale-up of a picture size.

There arise, however, the following problems inherent in the conventional art displaying apparatus. The attempt of enhancing the performance leads to an increase in size of the apparatus. This in turn worsens its portability and generality in terms of purpose as well, and it follows that the costs increase. Further, conversely when pursuing portability above all, the picture size becomes inevitably reduced. The image exhibiting the wider view angle can not be therefore provided.

Additionally, if a device corresponding to NTSC and a HD signal is used for an imaging device and a variety of panel displays, an aspect ratio is fixed. This conduces to a problem of decreasing a degree of freedom to obtain an aspect ratio desired by the viewer.

SUMMARY OF THE INVENTION

It is an object of the present invention to provide a multi-eye image displaying apparatus which obviates the above problems.

To accomplish this object, according to one aspect of the invention, there is provided a multi-eye image displaying apparatus comprising an image displaying means provided for each of right and left eyes having an illuminating means for emitting light, a display unit for displaying an image by using the light from said illuminating means and an optical system for projecting the beams from said display unit toward a pupil of a viewer and, as a result, forming a virtual image of the image to be displayed on said display unit in front of the pupil and a virtual image moving means for moving at least one of the virtual images for the right and left eyes in a horizontal direction.

In a preferable mode of the virtual image moving element, this element has an element for rotationally moving the image displaying member integral with the illumination member, the display unit and the optical system within a horizontal plane by defining the pupil as a center of rotation.

In a preferable mode of the virtual image moving element, this element has an optical deflecting element for deflecting the beams traveling from the display unit toward the pupil. Further, the optical deflecting element has a variable angle prism.

In a preferable mode of the virtual image moving element, this element has an element for moving the display unit within the horizontal plane.

In a preferable mode of the image displayed on the display unit, the image is switched over depending on movements of the virtual images.

In a preferable mode of the virtual images, the virtual images are moved depending on the image displayed on the display unit.

Some other characteristics and specific modes of the present invention are stated in detail in the embodiments which follow.

DESCRIPTION OF THE PREFERRED EMBODIMENTS

First Embodiment (FIGS. 1 through 9B)

Figure 1:
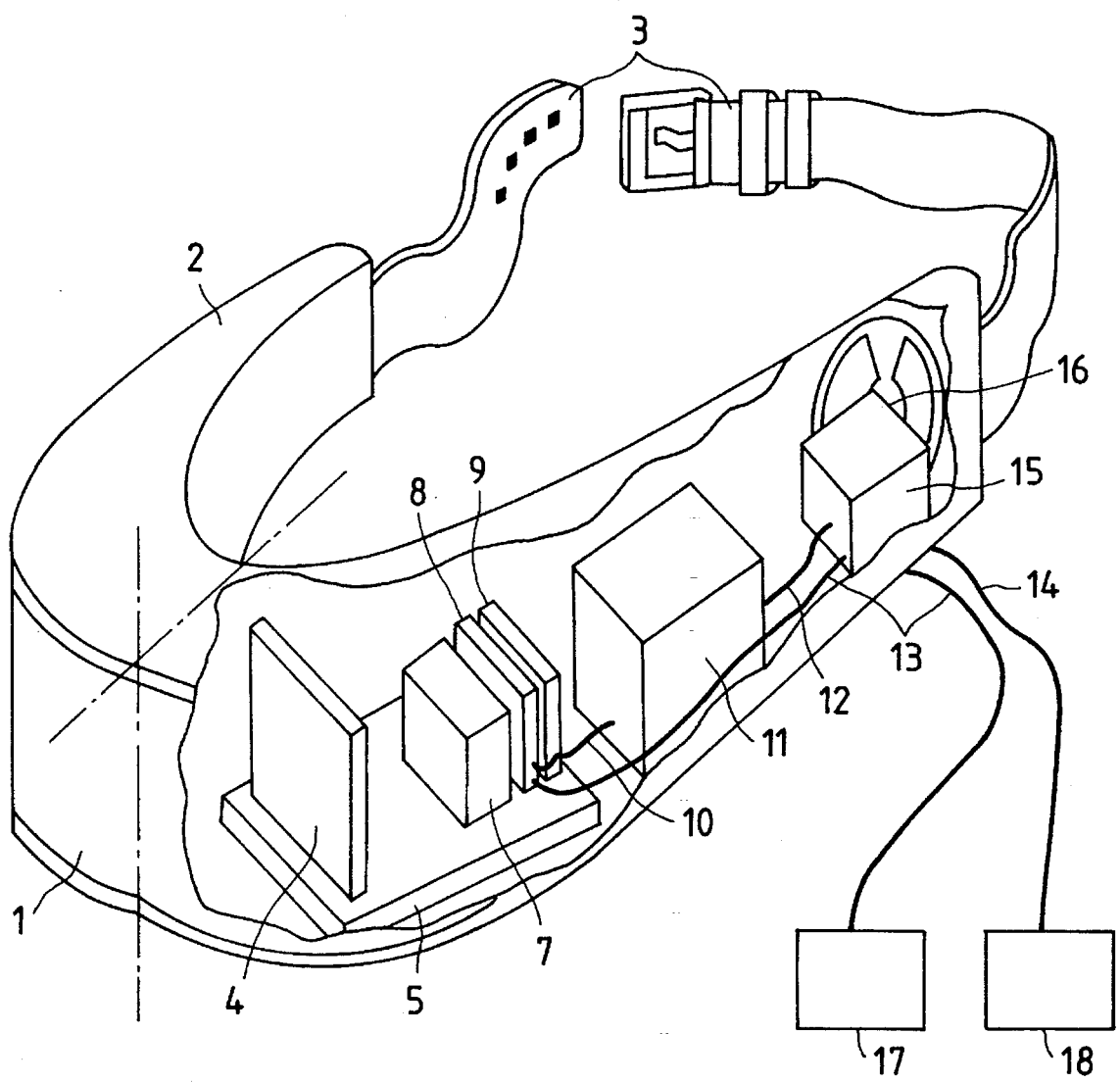
FIG. 1 is a schematic view illustrating a construction of an apparatus in a first embodiment.

FIG. 1 is a schematic view illustrating a construction of an apparatus in a first embodiment of the present invention. Referring to FIG. 1, a transparent window 1 is formed at a front portion of a body 2. This body 2 is molded of lightweight plastic or the like in such a shape as to be easily fitted to a human head, e.g., in a U-shape. Belts 3 are secured to both ends of the body 2. The body 2 is fitted through the belts 3 to the head as in the case of mounting a goggle. In FIG. 1, only an image display portion for a left eye is shown in perspective. A display portion for a right eye is, as a matter of course, symmetrically disposed.

A virtual image forming optical element 4 incorporates a function to deflect a beam of light from a display unit 8 which will be stated later toward a pupil of the user and forms an image of a display on the display unit in front of the user as virtual images. The virtual image forming optical element 4 in this embodiment involves the use of a curved aspherical half-mirror. The user is capable of viewing an external scene and a green display in superposition through the transparent window 1.

This aspherical half-mirror also has an optical power and is therefore capable of making the image largely magnify and forming the image far away. Further, the aspherical half-mirror has, in addition to the above, a function to compensate an optical aberration. Those other than the aspherical half-mirror suited to the virtual image forming optical element are a general lens system, a hologram, etc.. According to the present invention, however, the optical element is not necessarily directed to a reflection type. The present invention may take such a construction that the display unit or the like is disposed in front of the viewer, and the virtual image is magnified and displayed through a transmissive optical element.

A relay optical system 7 is inserted for compensating an aberration which could not be sufficiently compensated by the above virtual image forming optical element 4 alone or makes an intermediate image form on an optical object plane.

A small-sized display unit 8 herein involves the use of a liquid crystal optical element (hereinafter termed an LCD) having a size of 1.5 in. A backlight source constructed of a fluorescent lamp is employed as an illuminating unit 9.

A display projection optical system comprises the virtual image forming optical element 4, the relay optical system 7, the LCD 8 and the illuminating unit 9. These elements are fixed onto a fixing base 5 so that a relative layout does not change. The elements are also encased into the body 2.

A small-sized battery 11 serves as a power supply for the present apparatus. An electric current from this battery is transferred via lead wires 10, 12 to an image display section (the LCD 8 and the illuminating unit 9) and a sound output section (a small-sized amplifier 15 and a loud speaker 16). Note that as the power supply for this apparatus, the small-sized battery 11 is not necessarily mounted wherein the body 2, but the power may be supplied from outside via a lead wire (unillustrated).

The small-sized amplifier 15 amplifies a sound signal transmitted from a sound-signal generator 18 via a lead wire 14, thereby driving the loud speaker 16. There may also be such an embodiment where there small-sized amplifier 15 is not mounted within the body 2 as in the case of the above small-sized battery but is installed outside, with only the sound signal supplied through a lead wire (not shown).

The loud speaker 16 is located in a position corresponding to an ear of the user and reproduces a sound corresponding to an image. The sounds can be stereophonically outputted by use of the right and left loud speakers. Further, an image signal is transmitted from an image signal generator 17 via a lead wire 13 and inputted via an amplifier (not illustrated) to the LCD 8. The image signal inputted may include a video signal, an image signal of a computer, etc..

Figure 2:
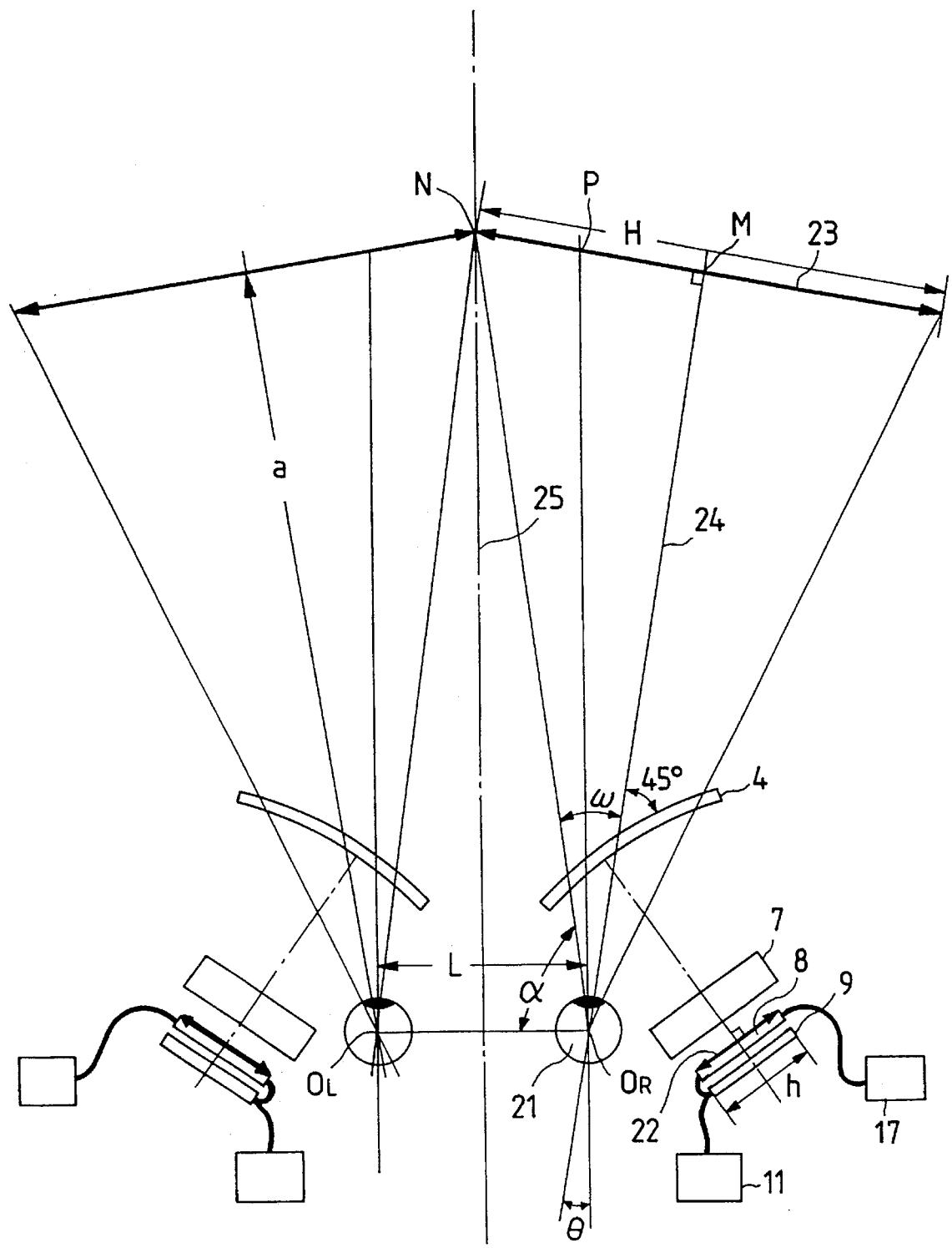
FIG. 2 is a view illustrating an optical layout for performing a panoramic display.

Given next is an explanation of a mode of viewing a panoramic image through the present apparatus in conjunction with FIG. 2. FIG. 2 is a view of a layout of the present apparatus as viewed from above. For simplicity, only the display projection optical system encased in the body 2 is illustrated therein. The reference numerals and the like in FIG. 2 are, for simplicity, illustrated in only the layout for the right eye as the layout for the left eye is bilaterally symmetrical.

The reflection type optical element defined as the virtual image forming optical element 4 is spaced 70 mm away from the center of an eyeball of the viewer but inclined by 45° to an optical axis 24. Other optical systems (the relay optical system 7, the LCD 8 and the backlight source serving as the illuminating unit 9) are disposed in a substantially parallel direction to the reflection type optical element 4 but spaced 100 mm away from the display surface of the LCD 8.

A beam from a display 8 is reflected by the reflection type optical element 4 toward the pupil of the viewer. The reflected beam makes an image form as a virtual image 23 in a position at a distance a from the center of the eyeball. The virtual image 23 is perpendicular to the optical axis 24. The displayed image 22 is magnified into the virtual image 23 having a dimension H which is β-times as large as a dimension h of the displayed image 22. At this time, it is assumed that the optical axis 24 is inclined at an angle θ to a perpendicular bisector (bisecting plane) 25 of a baseline $O_R$-$O_L$ (a length L) which connects the centers of two eyeballs.

For viewing a continuous panoramic image by the present apparatus, it is required that virtual images for the right and left eyes be contiguous to each other without any gap on the plane 25. For this purpose, the above angle θ is adjusted so that a left edge of the virtual image for the right eye is, as illustrated in the Figure, contiguous to a right edge of the virtual image for the left eye at a point N on the plane 25.

As illustrated in the Figure, in the case of the optical layout for the right eye, the angle θ is given as θ=90° −ω−α, where ω (ω>0) is the view angle of the virtual image 23, and α (α>0) is the angle made by the baseline $O_R$-$O_L$ and a baseline $O_R$-N, wherein ω=$\tan^{-1}$ (H/2a), and α=$\cos^{-1}$ (Lcosω/2a).

In accordance with this embodiment, L=65 mm, h=30.48 mm, β=40 power, and a =1500 mm. Consequently, the angle θ is given by: θ=−20.97° (wherein + implies a counterclockwise rotation). In this case, the placement of the fixing base 5 is adjusted so that the angle θ comes to the above value.

When viewing the panoramic image through this apparatus, the view angle is given such as: approximately 4ω=88.48°. It is possible to provide an image exhibiting a greatly wide view angle. Normally, the human eye does not rotate outward, and, therefore, a line-of-sight axis of the viewer is oriented in such a direction that θ=0°. A gazing-point exists in the vicinity of a point P. Therefore, an image of a wide view angle area is slightly hard to recognize. Generally, however, a visual acuity originally declines at a point far away from the gazing-point, and hence this does not become a serious problem.

Figure 3A:
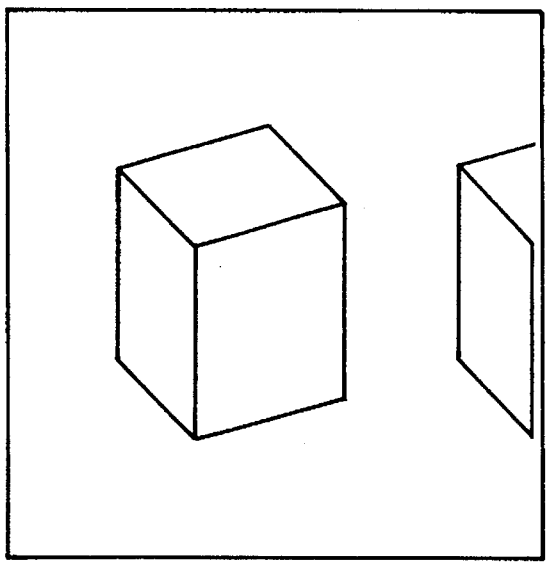
FIGS. 3A and 3B are views showing right and left eye images to be displayed and virtual images to be viewed in the optical layout of FIG. 2.
Figure 3A:
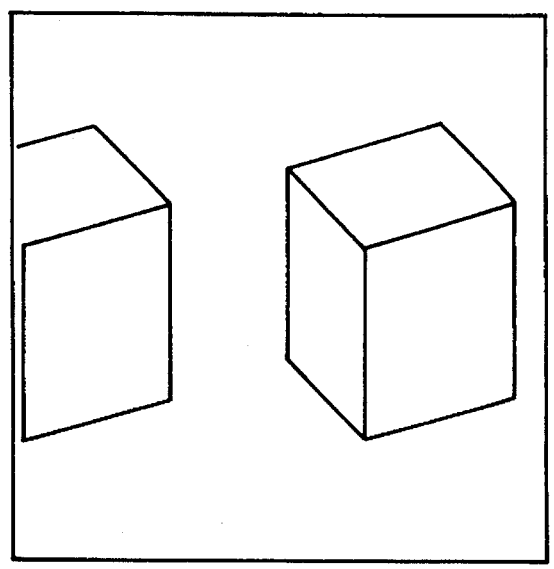
Figure 3B:
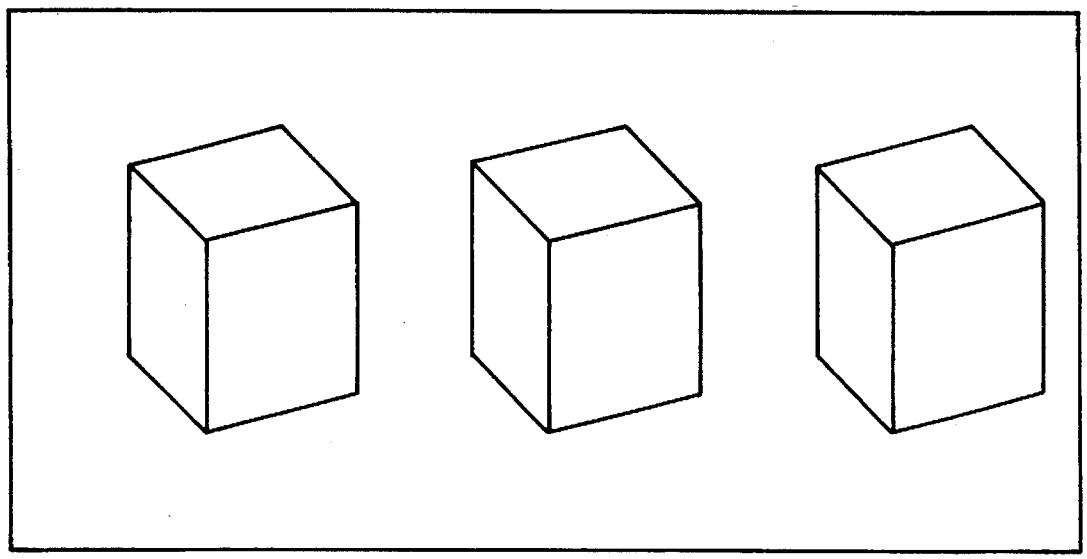

FIG. 3A shows examples of the right and left images displayed on the LCD 8. When viewing virtual images into which these display images are magnified by the present apparatus, as illustrated in FIG. 3B, there are obtained panoramic images having a wide view angle in the horizontal direction.

Figure 4:
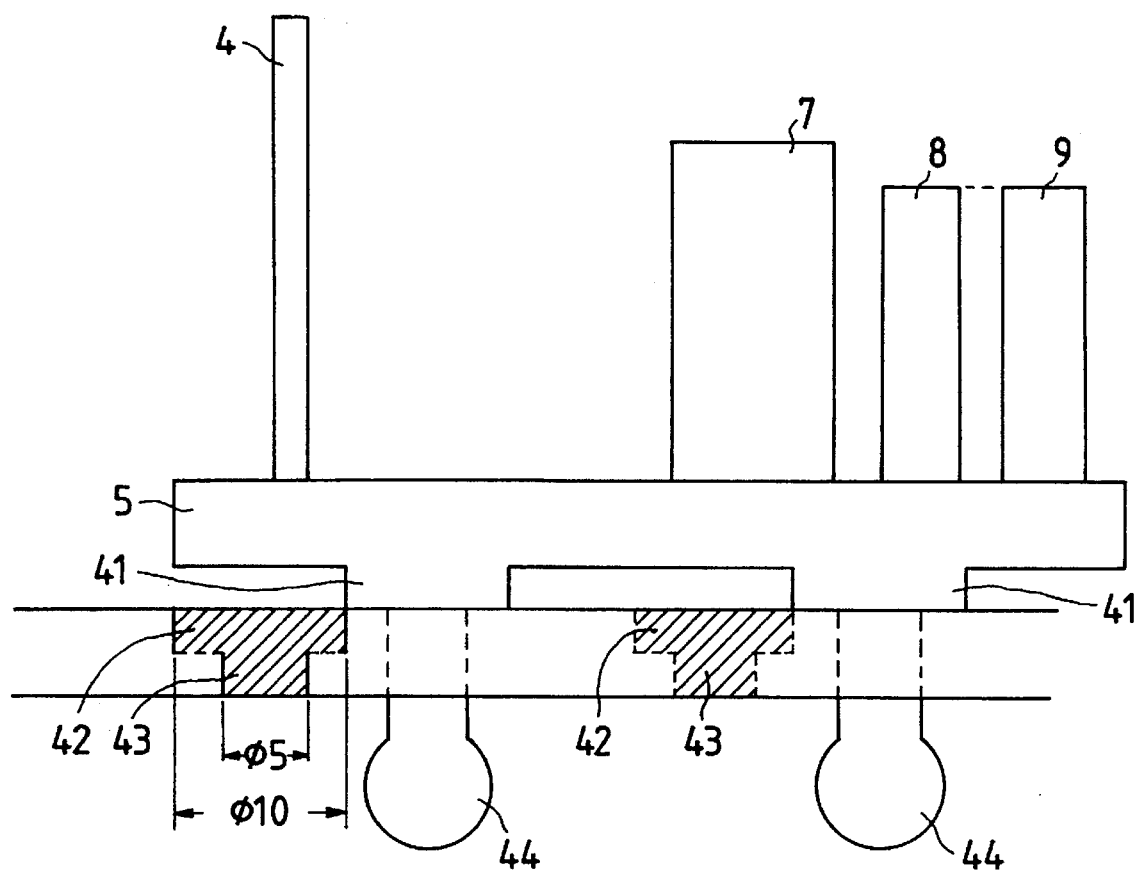
FIG. 4 is a view showing a configuration of a virtual image moving element for making at least one of the virtual images for the right and left eyes move in a horizontal direction.

Further, the panoramic images are provided by use of the present apparatus in the embodiment discussed above. However, the fixing base 5 of the present apparatus is movably constructed as a virtual image moving element, whereby the apparatus functions as a stereoscopic displaying apparatus. A construction of the stereoscopic displaying apparatus is substantially the same as that in FIG. 1. Therefore, FIG. 4 illustrates modified points in terms of construction of the stereoscopic displaying apparatus, wherein a repetitive explanation is omitted by marking the same elements as those in FIG. 1 with the like numerals and the like.

A bottom surface of the fixing base 5 is formed with two circular protrusions 41 each having a diameter (φ) of 10 mm and a thickness of 5 mm. The bottom surface is also formed with two knobs 44 projecting from these protrusions 41 each having a diameter (φ) of 5 mm. Each knob penetrates a guide slot 43 having a width of 5 mm or larger which is formed in the body 2.

Figure 5:
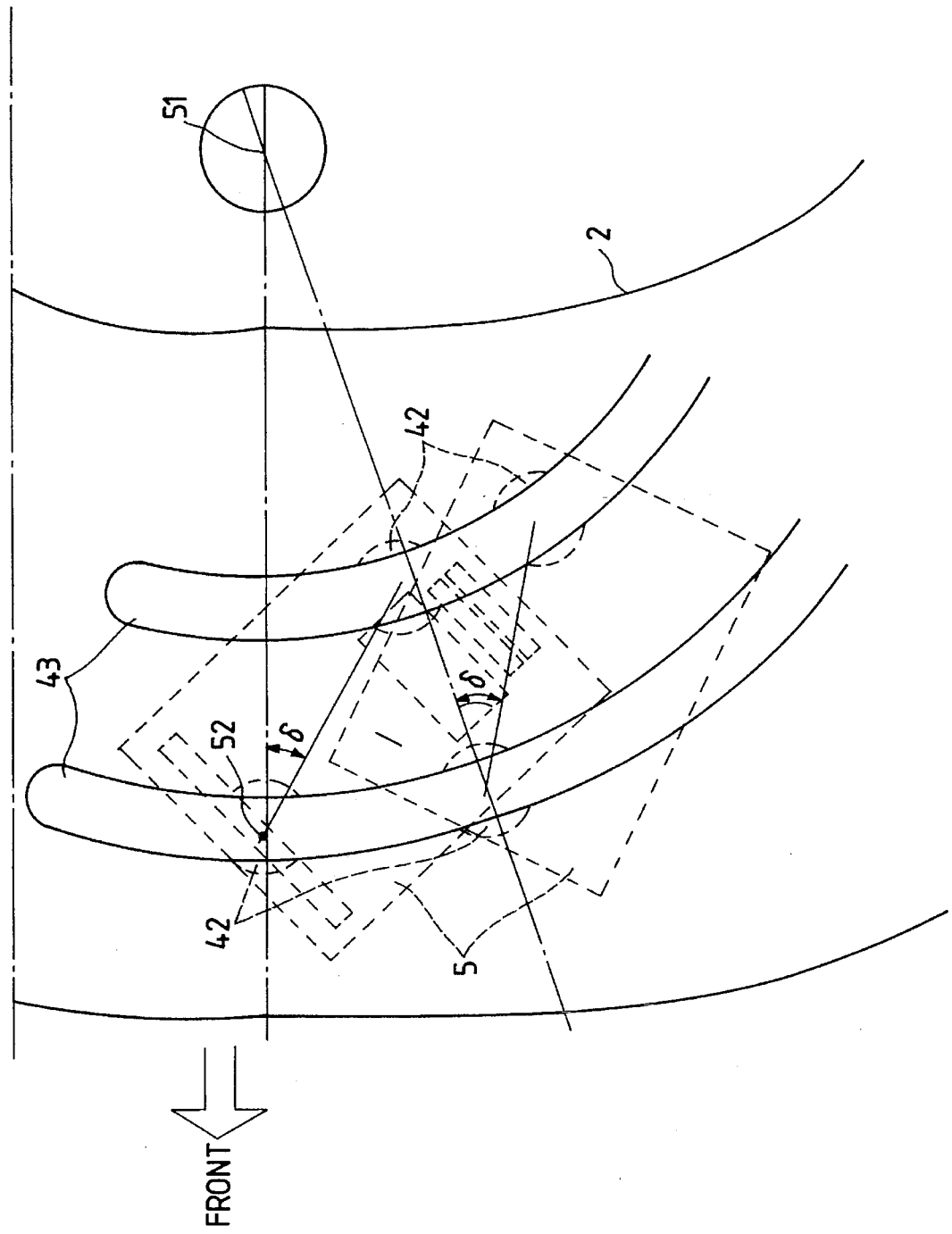
FIG. 5 is a view of a right-eye-oriented portion of the apparatus of FIG. 4 as viewed from a bottom surface.

FIG. 5 is a view of the right-eye-oriented portion of the body 2 as viewed from the bottom surface. The guide slots 43 are arranged in two lines concentrically with an eyeball center 51 ($O_R$) of the viewer. Circular grooves 42 assuming shapes complimentary to the circular protrusion 41 are formed in predetermined positions along the guide slot 43. In a normally used state, the circular protrusion 41 is fixedly fitted in the circular groove 42 by dint of the weight of the fixing base 5.

In order to more the fixing base 5 to another position, the knob 44 is pushed upward, and the fixing base 5 is moved along the guide slots 43. The circular protrusion 41 is allowed to engage with the circular groove 42 in the different position and is thus fixed thereto.

Note that a center 52 of the reflection type optical element 4 is located coaxially with the center of one circular protrusion extending from the bottom surface of the fixing base. Furthermore, some consideration is given to the position of another circular groove 42 so that 6 does not change in FIG. 5. Accordingly, a relative position and angle of inclination of the reflection type optical element 4 with respect to the pupil of the viewer do not change before and after being moved. Besides, the position of each circular groove 42 is predetermined by a fixing base placement determining method for a stereoscopic vision which will be mentioned later.

The present apparatus can be easily improved by electrically moving and fixing the fixing base 5 or adding a small-sized adjustment mechanism and a non-stage moving mechanism. For simplicity, however, a specific example to be given will be omitted.

Next, a mode of the stereoscopic display by use of the above fixing base moving function will be explained.

In general, the stereoscopic vision can be attained by independently presenting two images (a stereo pair) having a binocular parallax to the right and left eyes, respectively. On the occasion of presenting these images, however, if the two virtual images are presented in such a case that the two virtual images are spatially largely separated as in the example of the panoramic image display given above, it is difficult to fuse the images. This gives fatigue and uncomfortableness to the user. For this reason, the image fusion becomes easier by presenting the two virtual images so that the positions thereof are overlapped with each other.

Figure 6:
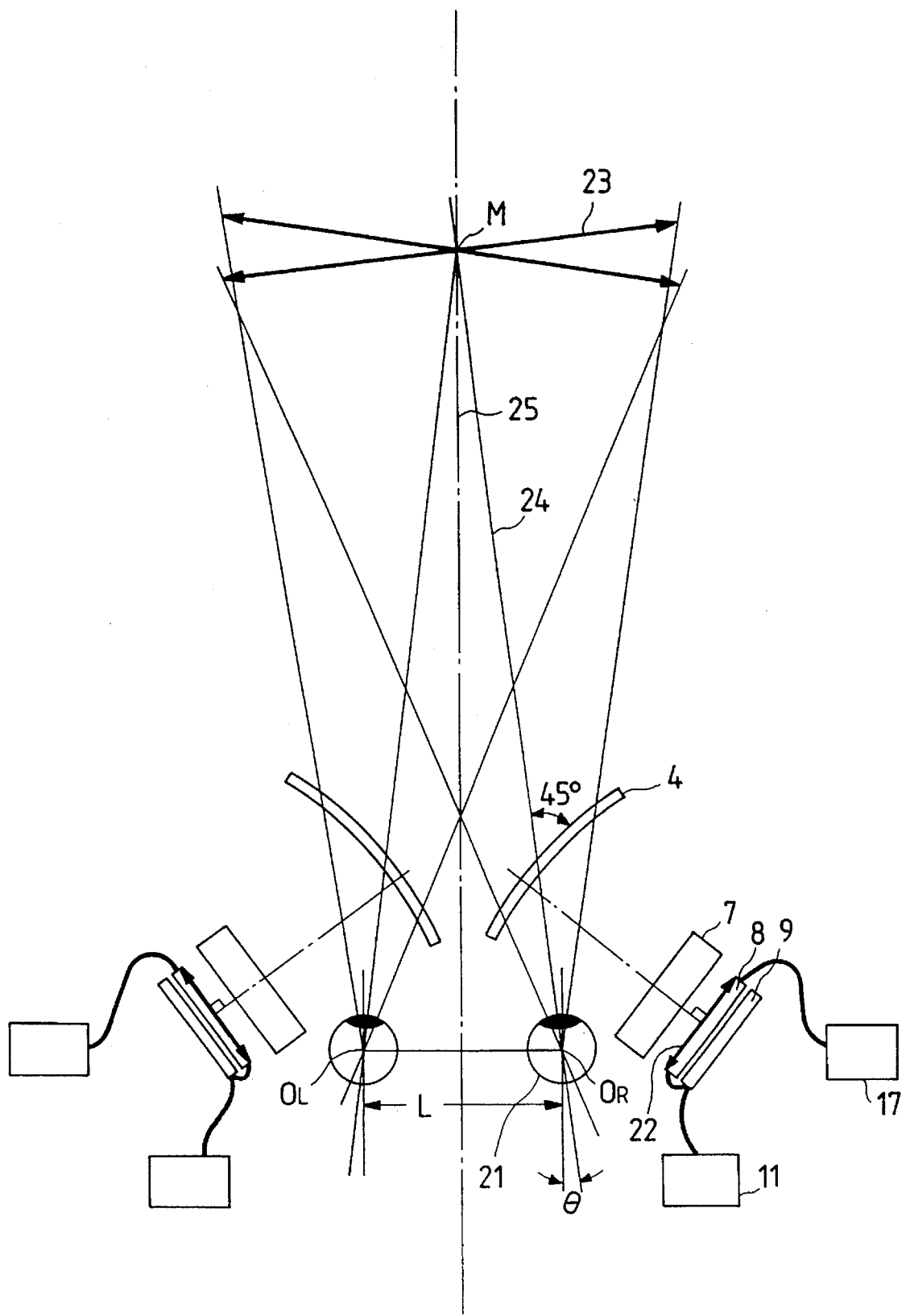
FIG. 6 is a view showing an optical layout for performing a stereoscopic display.

FIG. 6 illustrates an optical layout in which the stereoscopic display is performed based on this principle. The same elements as those in FIG. 2 are marked with the like numerals and the like, and a repetitive explanation will be omitted. As stated above, the reflection type optical element 4 makes such a rotary motion that only the angle θ is varied without changing the distance from the eyeball center and the inclination to the optical axis 24. Hence, an image forming performance of the virtual image 23 and the distance from the eyeball center do not change.

Further, for making the stereoscopic vision easy, the fixing base 5 is rotated to a position where both of the centers of the right and left virtual images exist on the plane 25 so that the positions of the two virtual images are overlapped with each other. A central point M of the right-eye-oriented virtual image in the Figure exists on the plane 25. The left-eye-oriented virtual image is formed in symmetry with respect to the plane 25. At this time, the inclination angle θ of the optical axis to the plane 25 satisfies a relationship such as $\theta = \sin^{-1}(L/2a)$.

In accordance with this embodiment, L=65 mm, and a =1500 mm. In the right-eye-oriented optical system, the angle θ is given by: θ=+1.24° (wherein +implies a counterclockwise rotation). Hence, a moving quantity is adjusted so that the angle of rotation of the fixing base 5 comes to this angle. When viewing the stereoscopic image in accordance with this embodiment, the view angle is given such as: approximately 2ω=44.24°.

Figure 7A:
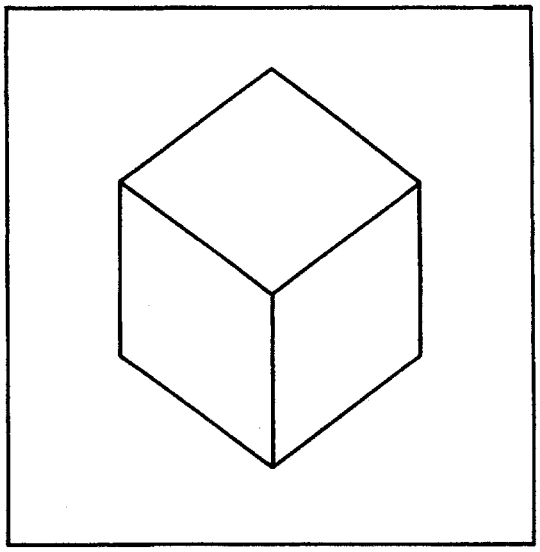
FIGS. 7A and 7B are views showing right and left images to be displayed and virtual images to be viewed in the optical layout of FIG. 6.
Figure 7A:
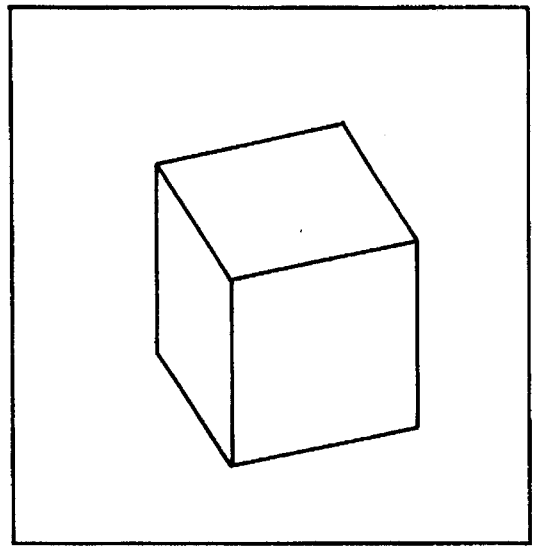
Figure 7B:
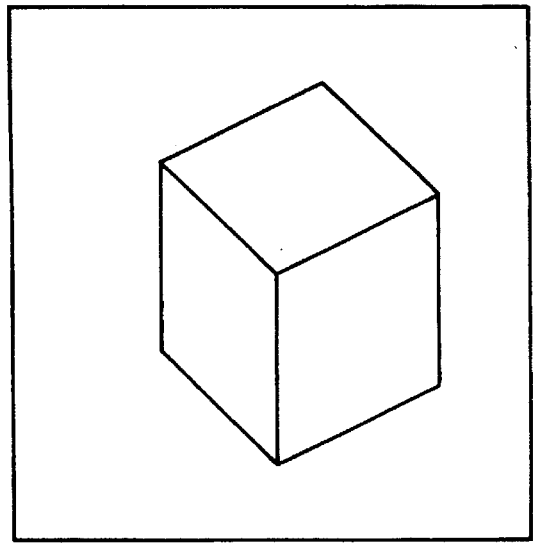

FIG. 7A shows examples of the right and left images displayed on the LCD 8. The right and left images are stereo-paired with each other. When viewing virtual images into which those display images are magnified on the above conditions through the present apparatus, a stereoscopic image is obtained as shown in FIG. 7B. At this time, an image forming position of the virtual image and a gazing-point coincide with the central point M. Besides, an angle 2θ made by the optical systems for the two eyes is made coincident with an angle of convergence of a human being. It is therefore possible for the viewer to view the stereoscopic image with a less amount of senses of incongruity and fatigue.

Given next is an explanation of a mode of displaying an image (hereinafter termed a 2D–3D mixed image) in which a two-dimensional image (2D) and a three-dimensional image (3D) are mixed by use of the present apparatus. The construction of the apparatus is substantially the same with those in the above panoramic image display and the stereoscopic image display. Differences there between are a rotary moving angle of the optical system and a method of inputting the image. These two points will be therefore described.

Figure 8:
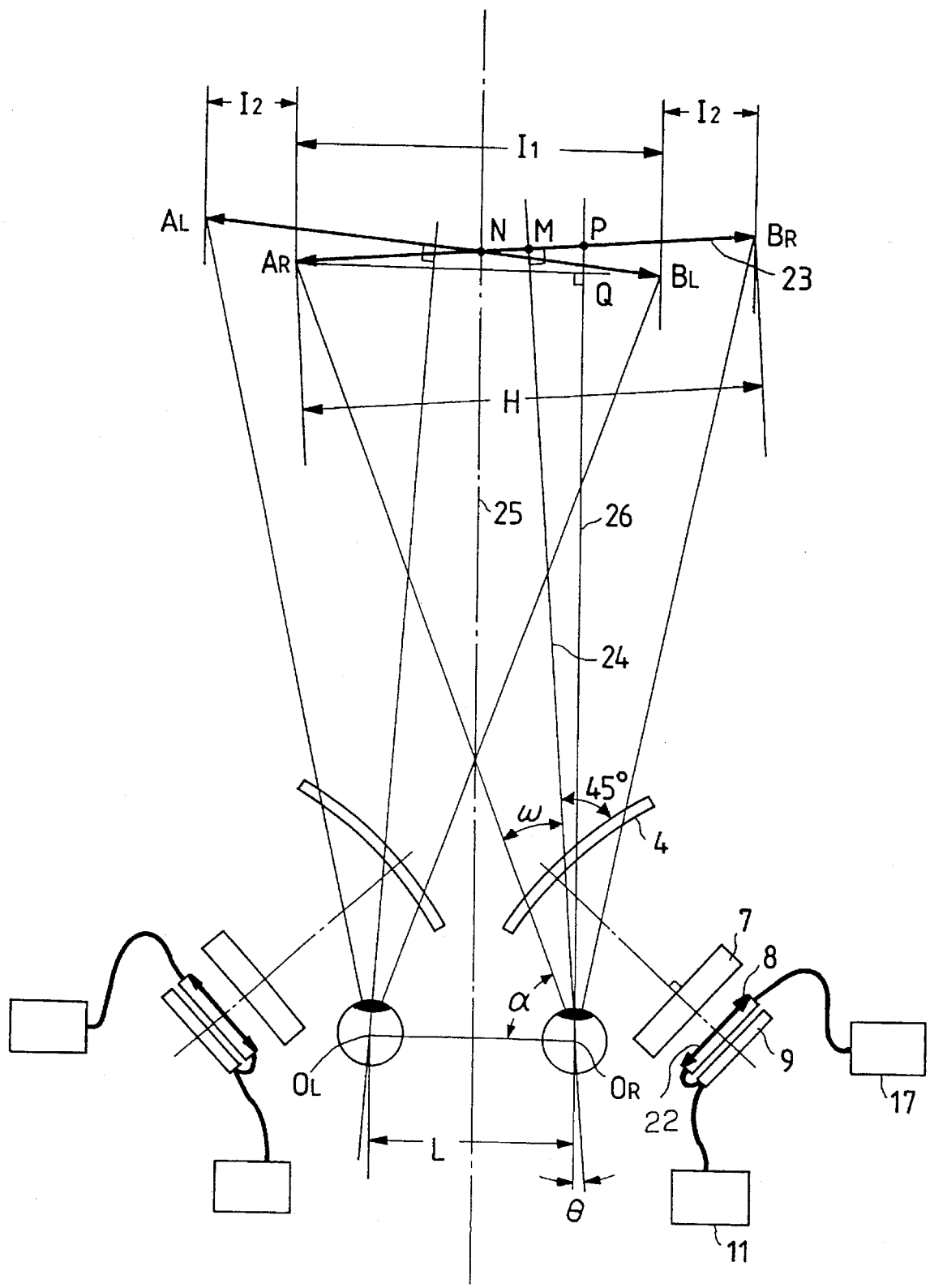
FIG. 8 is a view illustrating an optical layout for displaying a mixed image of a two-dimensional image and a three-dimensional image.

FIG. 8 is a view illustrating an optical layout for displaying the 2D–3D mixed image. Right and left virtual images are overlapped with each other. Unlike the stereoscopic image display, however, the arrangement is that the images are not overlapped over the entire area, but only some portions of the right and left images are overlapped. At this time, the right-eye-oriented virtual image 23 intersects the plane 25 at the point N to the left of the central point M of the virtual image. The left-eye-oriented virtual image is disposed in symmetry with respect to the plane 25.

At this moment, the three-dimensional image defined as a stereoscopic image can be viewed in an area (a 3D area) ranging from a point $A_R$ to a point $B_L$ in the Figure. It follows that the two-dimensional image is viewed in an area (a 2D area) on the left side from the point $A_R$ and an area (the 2D area) on the right side from the point $B_L$. Referring to the Figure, let P be an intersection between the virtual image 23 and a plane 26 parallel to the plane 25 but passing through the right eyeball center $O_R$, and let Q be a toe of a perpendicular line extending from $A_R$ down to the plane 26.

When a breadth of the 3D area is expressed by using a length $l_1$ of a line segment $A_R$-$B_L$ in a direction along the baseline $O_L$-$O_R$ of the viewer, $l_1$ is given by: $l_1=2\cdot(A_RQ-L/2)$. $A_RQ=a\cdot\tan(\omega+\theta)$, and hence the angle can be expressed such as: $\theta=\tan^{-1}(l_1/(2a)+L/(2a))-\omega$. Further, when a breadth of the 2D area is expressed by employing a length $l_2$ of a line segment $A_L$-$A_R$ in the direction along the baseline $O_L$-$O_R$ of the viewer, the length $l_2$ is given by: $l_2=H\cdot\cos\theta-l_1$.

In accordance with this embodiment, L=65 mm, a=1500 mm, and H=1219.2 mm. Hence, when the breadth $l_1$ of the 3D area is set so that H/2=609.6 mm, the angle $\theta$ in the right-eye-oriented optical system becomes such as: $\theta=-9.45°$ (wherein + implies the counterclockwise rotation).

Accordingly, at this time, the moving quantity is adjusted so that the angle of rotation of the fixing base 5 becomes this angle. Besides, the breadth $l_2$ of the 2D area at this time is 593.05 mm. Based on the above-described construction of the apparatus, the whole view angle when viewing a stereoscopic and panoramic mixed image becomes approximately 61.83°. A view angle of an area which permits the stereoscopic vision therein is approximately 22.12°.

Figure 9A:
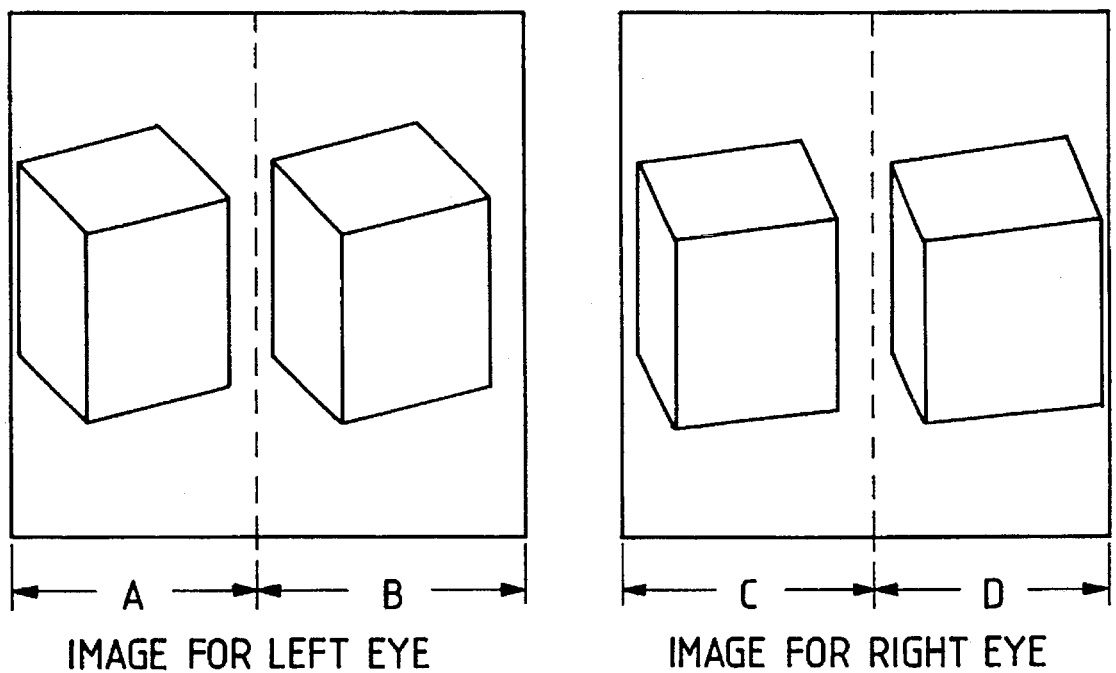
FIGS. 9A and 9B are views showing right and left images to be displayed and virtual images to be viewed in the optical layout of FIG. 8.
Figure 9B:
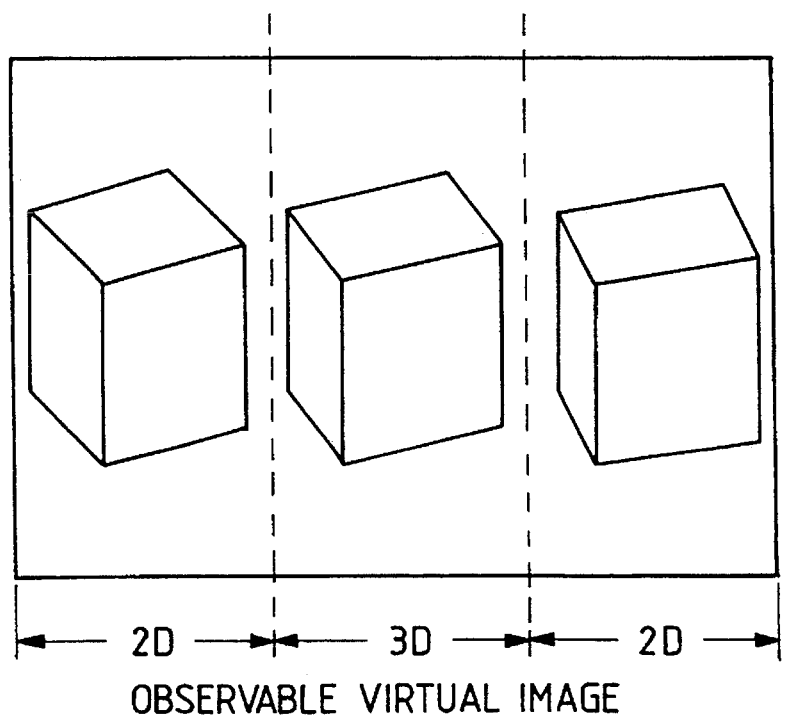

FIG. 9A shows examples of the right and left images displayed on the LCD 8. The right and left images are stereo-paired. However, there exists no area of the right-eye-oriented image which corresponds to the area A of the left-eye-oriented image. An area of the left-eye-oriented image which corresponds to an area D of the right-eye-oriented image does not exist either. However, the image in the area B of the left-eye-oriented image corresponds to the image in the area C of the right-eye-oriented image. When viewing virtual images into which these display images are magnified through the present apparatus, 2D and 3D mixed images shown in FIG. 9B are obtained.

In accordance with this embodiment, the breadth of the 3D area when viewing the virtual image is set to 609.6 mm, and the magnifying power is set such as: β=40 power. Accordingly, the breadth of each of the areas B, C on the LCD 8 is set to 15.24 mm. The fixing base 5 is thus provided with the moving mechanism described above. The single apparatus corresponds to both of the panoramic image display and the stereoscopic image display. Besides, it is possible to construct the apparatus capable of providing the panoramic and stereoscopic image mixed display. For example, with movements of the two virtual images, the image to be displayed is automatically switched over from the panoramic display to the stereoscopic display. Alternatively, if the image to be displayed is switched over from the panoramic display to the stereoscopic display, the virtual images corresponding thereto are automatically moved.

Second Embodiment (FIGS. 10 to 15)

Figure 10:
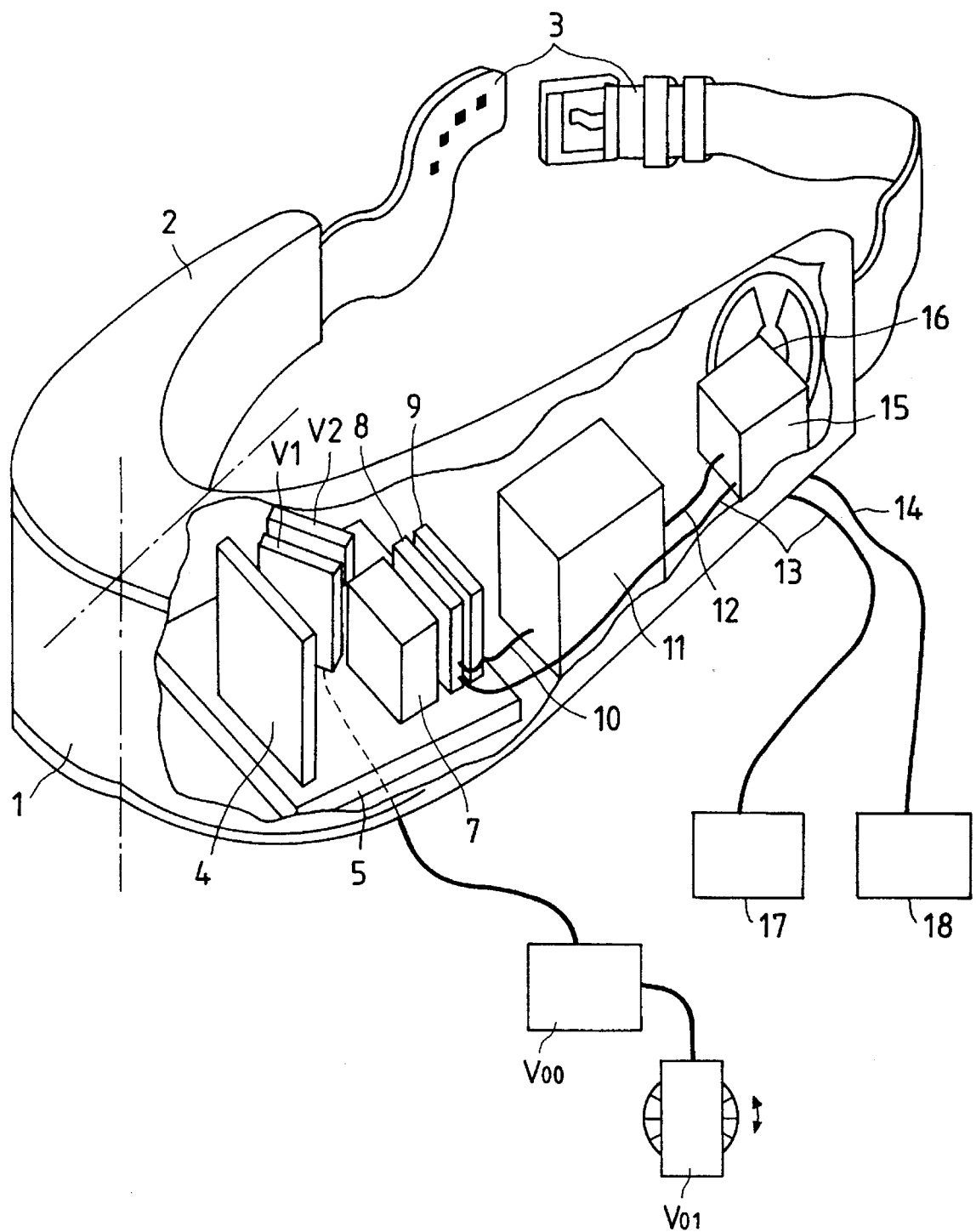
FIG. 10 is a schematic view illustrating a construction of the apparatus in a second embodiment.

FIG. 10 is a schematic view illustrating a second embodiment of the present invention. The principal elements constituting the display apparatus are substantially the same as those in the preceding embodiment. In accordance with the first embodiment, however, the fixing base 5 mounted with the display optical system is rotated for rotationally shifting the virtual image forming positions. In contrast in the second embodiment, a display projection optical system comprising reflection type optical systems 4, 7 and LCDs 8, 9 is fixed to the body 2.

Figure 11:
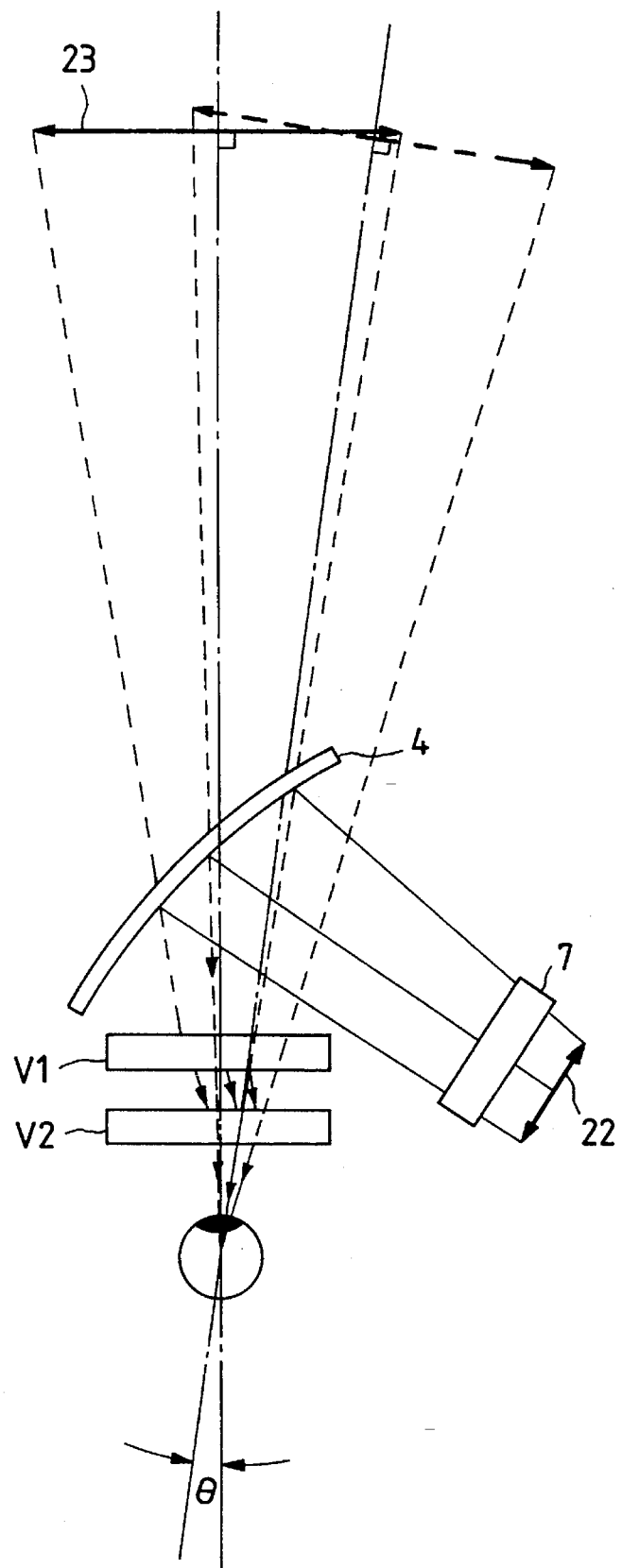
FIG. 11 is a view showing an optical layout in the second embodiment.

Instead, as depicted in FIGS. 10 and 11, beams of light which have been reflected or diffracted from the reflection type optical element 4 are deflected by variable angle prisms (hereinafter abbreviated to VAPs) defined as optical deflecting elements disposed between the reflection type optical element 4 and the viewer. The deflected beams are incident on the pupil of the viewer, thus moving the virtual images.

Figure 12:
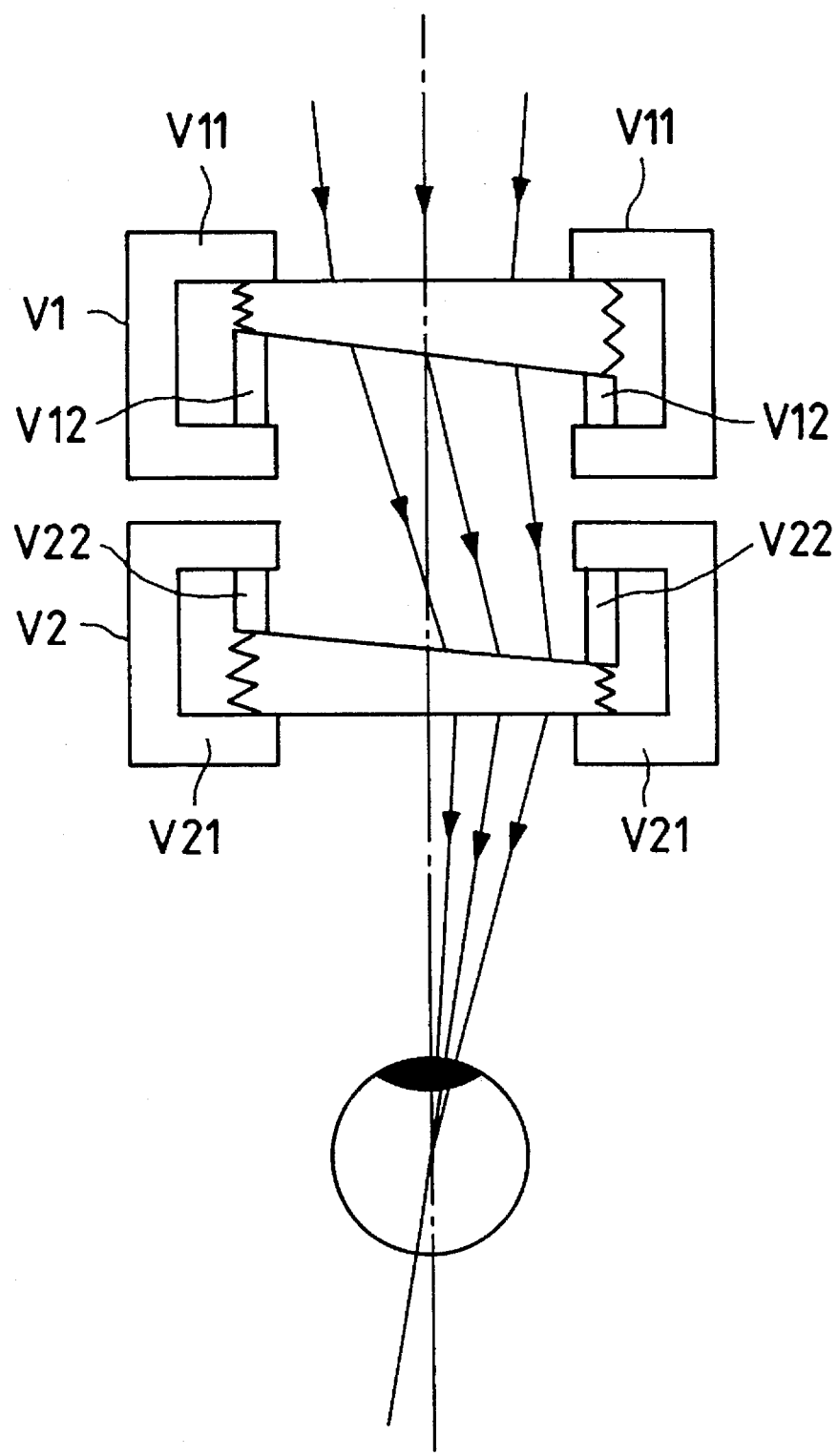
FIG. 12 is an enlarged view illustrating a variable angle prism employed in the second embodiment.

FIG. 12 is an enlarged view of the VAP. Referring to FIG. 12, the symbols V11, V21 represent support tools, while V12, V22 designate actuators.

Figure 13A:
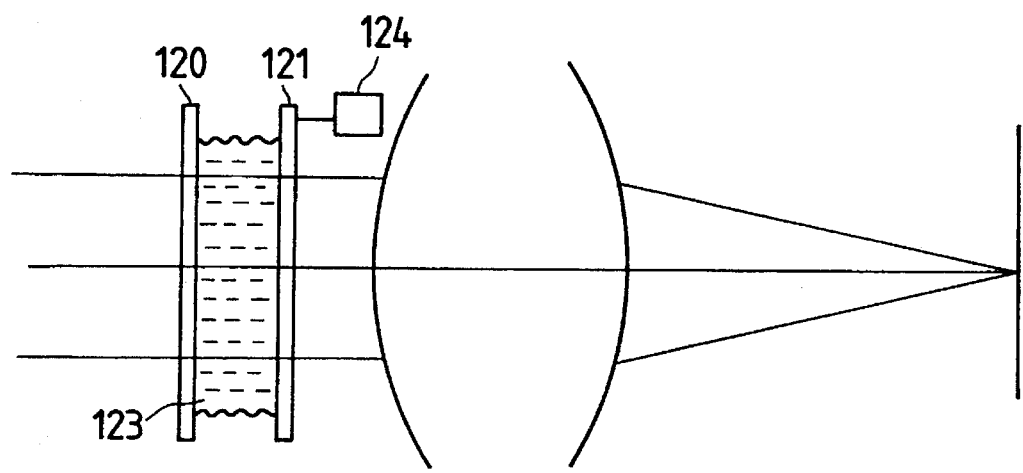
FIGS. 13A and 13B are views of assistance in explaining an operation of the variable angle prism.
Figure 13B:
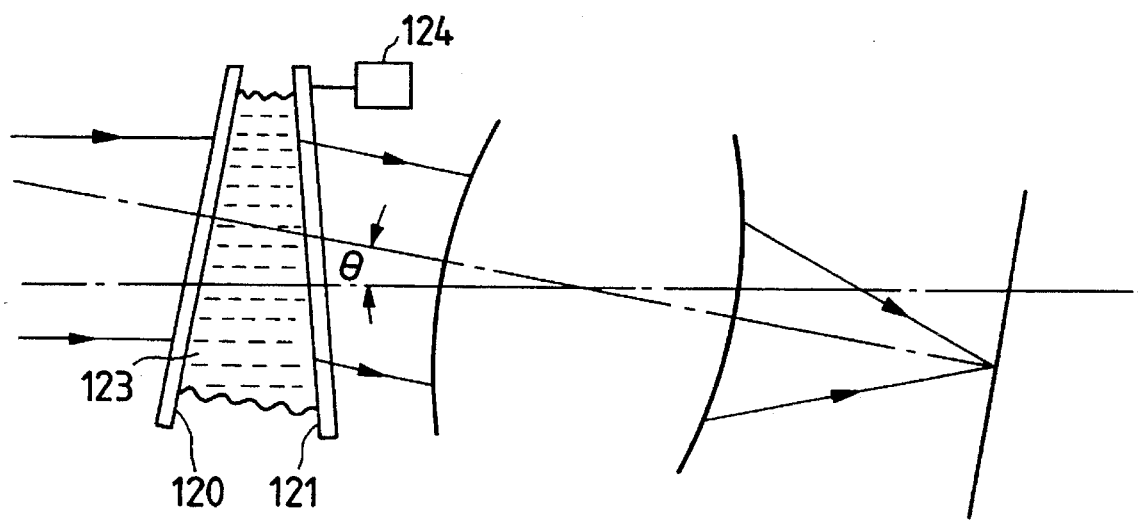

FIGS. 13A and 13B illustrate a configuration of the VAP disclosed in, e.g., Japanese Patent Publication No. 57-7416. Referring to FIGS. 13A and 13B, the numerals 120, 121 denote transparent glass plates, and 123 represents a transparent liquid. A control system 124 drives the glass plate 121.

When the two glass plates 120, 121 are parallel to each other as shown in FIG. 13A, the beams incident on the VAP are not deflected. If the glass plate 121 is, as illustrated in FIG. 13B, tilted by the control system 124, the transparent liquid 123 interposed between the two glass plates 120, 121 acts as a proper vertical angle prism, whereby the beams can be deflected.

Turning to FIG. 10, the symbol $V_{01}$ designates a beam deflection angle adjusting switch. A driving circuit $V_{00}$ in the present apparatus independently regulates the two VAPs and vertical angles V1, V2. It is therefore possible to attain an arbitrary rotary angle $\theta$ designated by $V_{01}$ while restraining a decline of the virtual image forming state down to a low level.

Further, when inserting the relay optical system 7 for compensating the aberration on the pupil side of the VAP or on the virtual image side, the decline of the virtual image forming state can be restrained down to a lower level.

Figure 14:
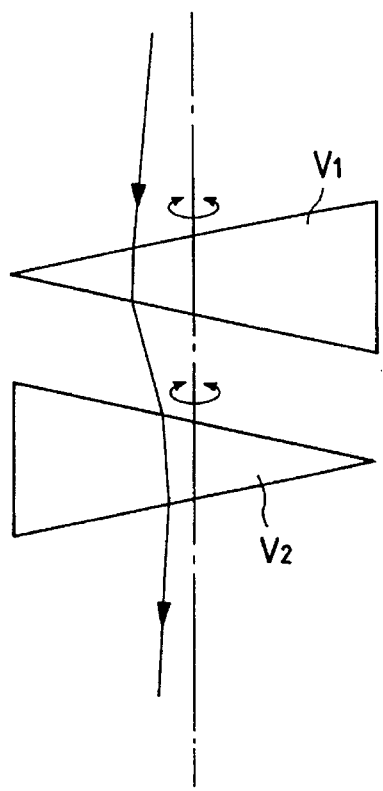
FIG. 14 is a view of assistance in explaining a beam deflection by rotating an ordinary prism.
Figure 15:
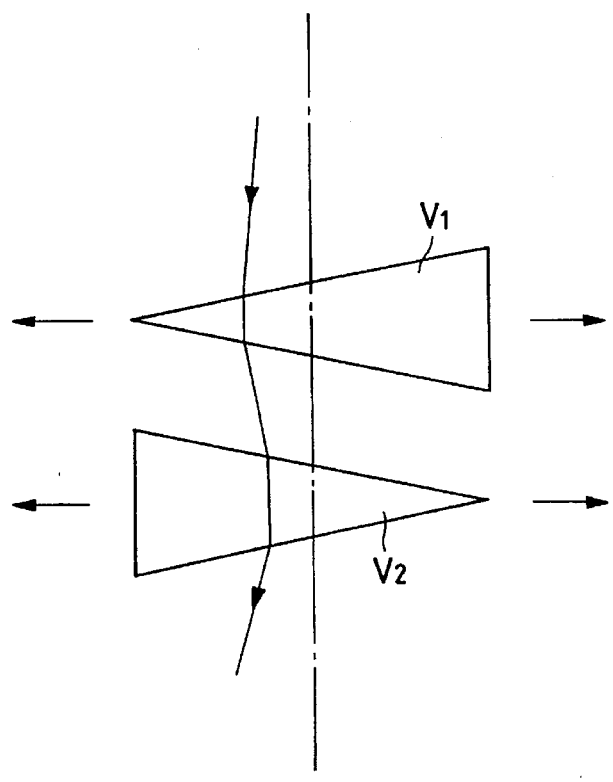
FIG. 15 is a view of assistance in explaining the beam deflection by shifting the ordinary prism sideways.

A means for obtaining the same beam deflecting effect with the VAP may involve the use of those for adjusting the angle of deflection through rotations of two pieces of fixed vertical angle prisms about the optical axis as shown in FIG. 14 or through sideway shifts of the two fixed vertical angle prisms as shown in FIG. 15. Those elements may be replaced by the VAPs in this embodiment and therefore be used.

The optical layout other than the VAPs in this embodiment is the same as that in the case where the rotary angle $\theta$ of the optical axis 24 is set to be 0° in the apparatus in the first embodiment. If the rotary angle $\theta$ is set to −20.97° by regulating the VAPs, however, a panoramic image exhibiting a wide view angle in the horizontal direction can be displayed. Further, if the rotary angle is set to be +1.24°, a stereoscopic image can be also displayed.

Moreover, if the rotary angle is set to be −9.45°, it is possible to display panoramic and stereoscopic mixed images. The viewer using the present apparatus is capable of switching over the above 3-stage image display state through a deflection angle adjusting switch $V_{01}$ connected to the driving circuit for the VAPs. The viewer is also able to freely set an intermediate state at each stage by continuously varying the rotary angle $\theta$.

Note that the image data displayed on the display unit 8 are, as a matter of course, switched over to those corresponding to respective purposes as done in the first embodiment when switching over the display thereof. Further, in contrast to the first embodiment, the image data are switched over to those for the panoramic and stereoscopic displays, and, as a matter of course, the driving circuit for the VAPs is thereby controlled to obtain positions of the virtual images corresponding thereto.

Third Embodiment (FIGS. 16 through 20)

Figure 16:
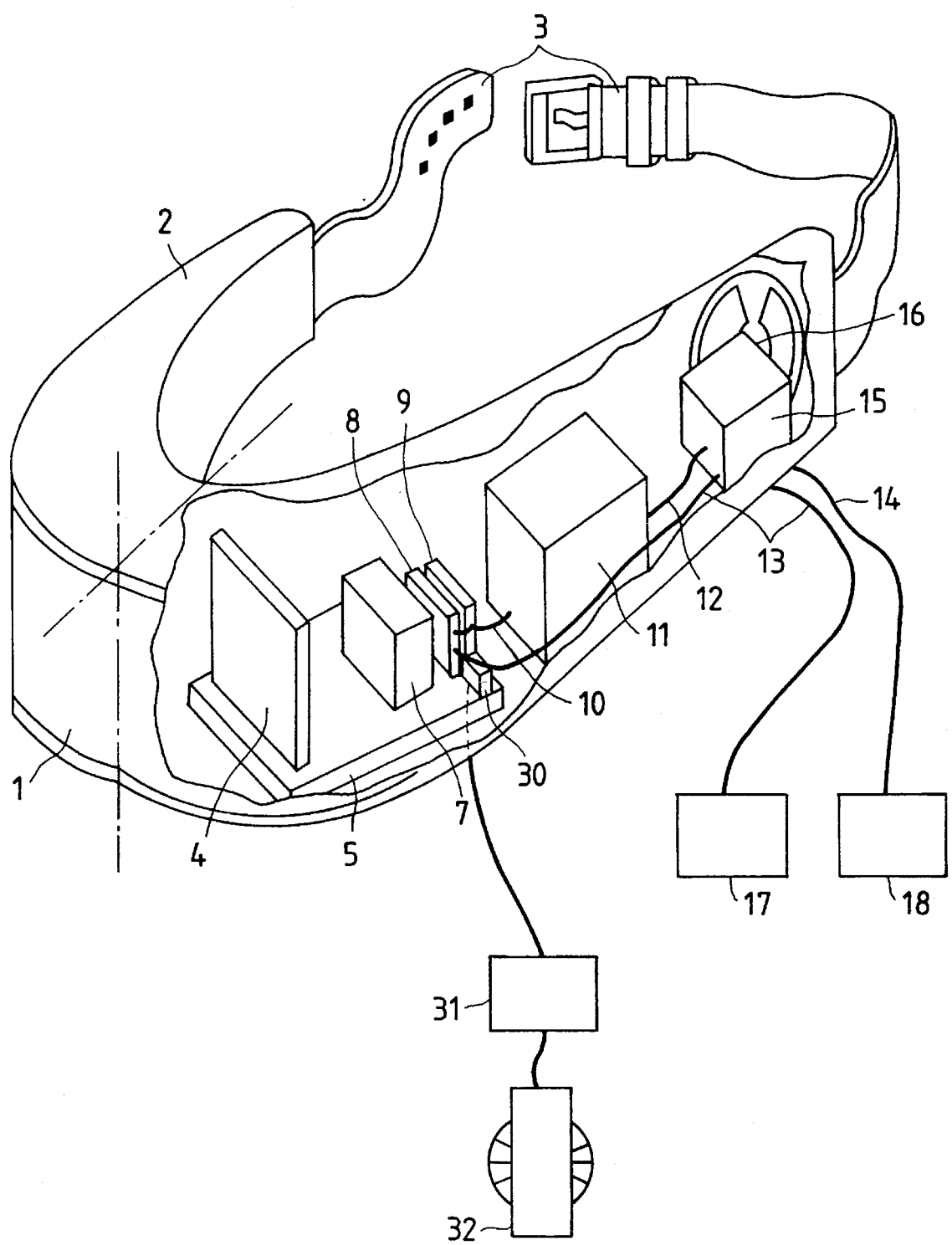
FIG. 16 is a schematic view illustrating a construction of the apparatus in a third embodiment.

FIG. 16 is a schematic view illustrating a third embodiment of the present invention. The principal construction of the displaying apparatus is substantially the same as that in the first embodiment shown in FIG. 1. A different point is that the small-sized display unit 8 and the illuminating unit 9 are shifted sideways to move the virtual image forming positions. Referring to FIG. 16, an actuator 30 makes the small-sized display unit 8 and the illuminating unit 9 move. A driving circuit 31 controls the actuator 30. The numeral 32 designates a control quantity adjusting switch.

Figure 17:
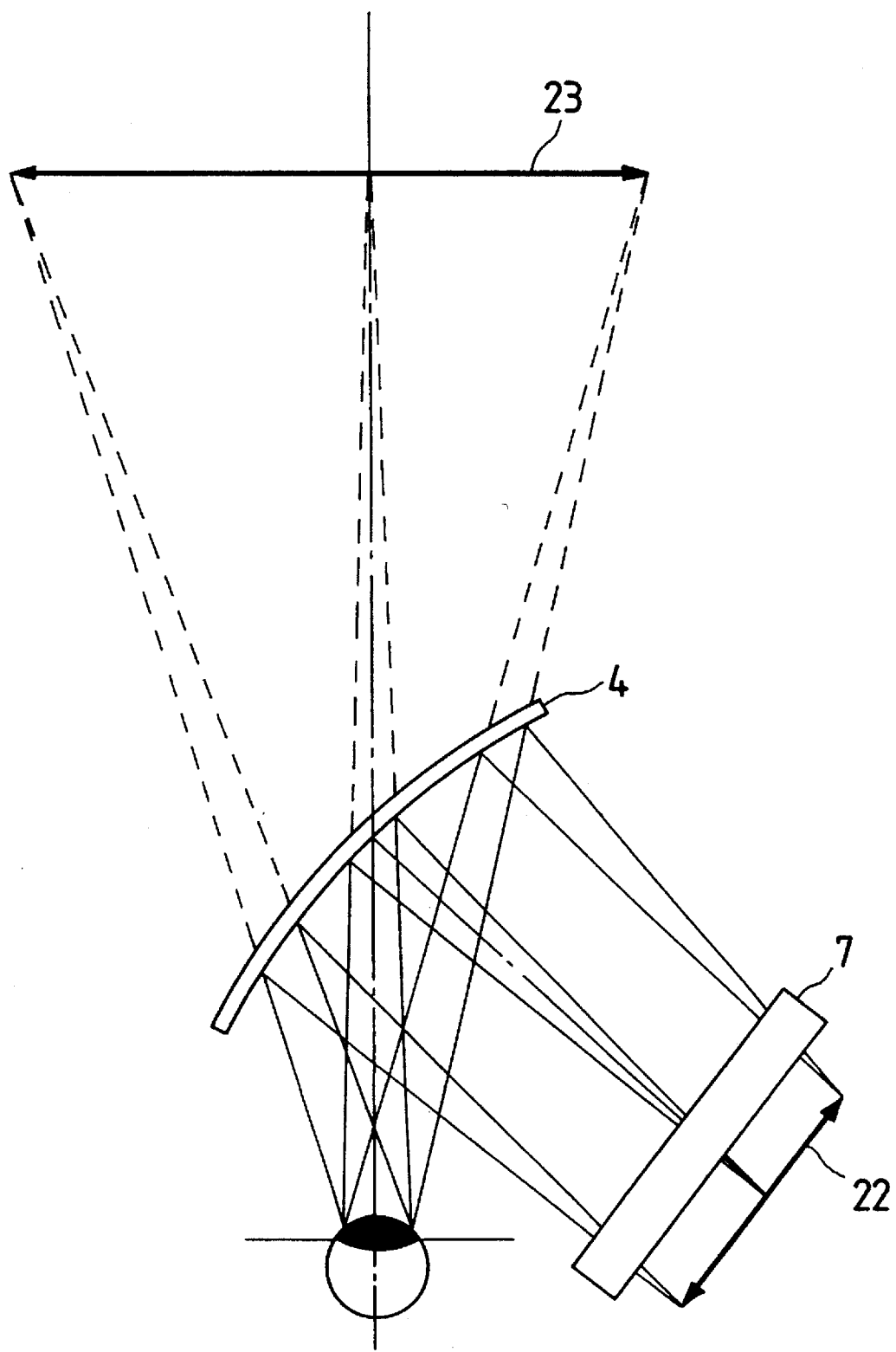
FIG. 17 is a view showing an optical layout for effect a virtual image display in the third embodiment.

FIG. 17 illustrates a virtual image forming state through the reflection type optical element 4 and the relay optical system 7 in this embodiment. A characteristic of the virtual image forming state in this embodiment is that an object height and an image height on the object plane and the image plane are large, although the power is the same as that in the embodiments discussed above. The object height covers a range larger than a size of the display unit 8, while the image height extends over a wide range, correspondingly.

Figure 18:
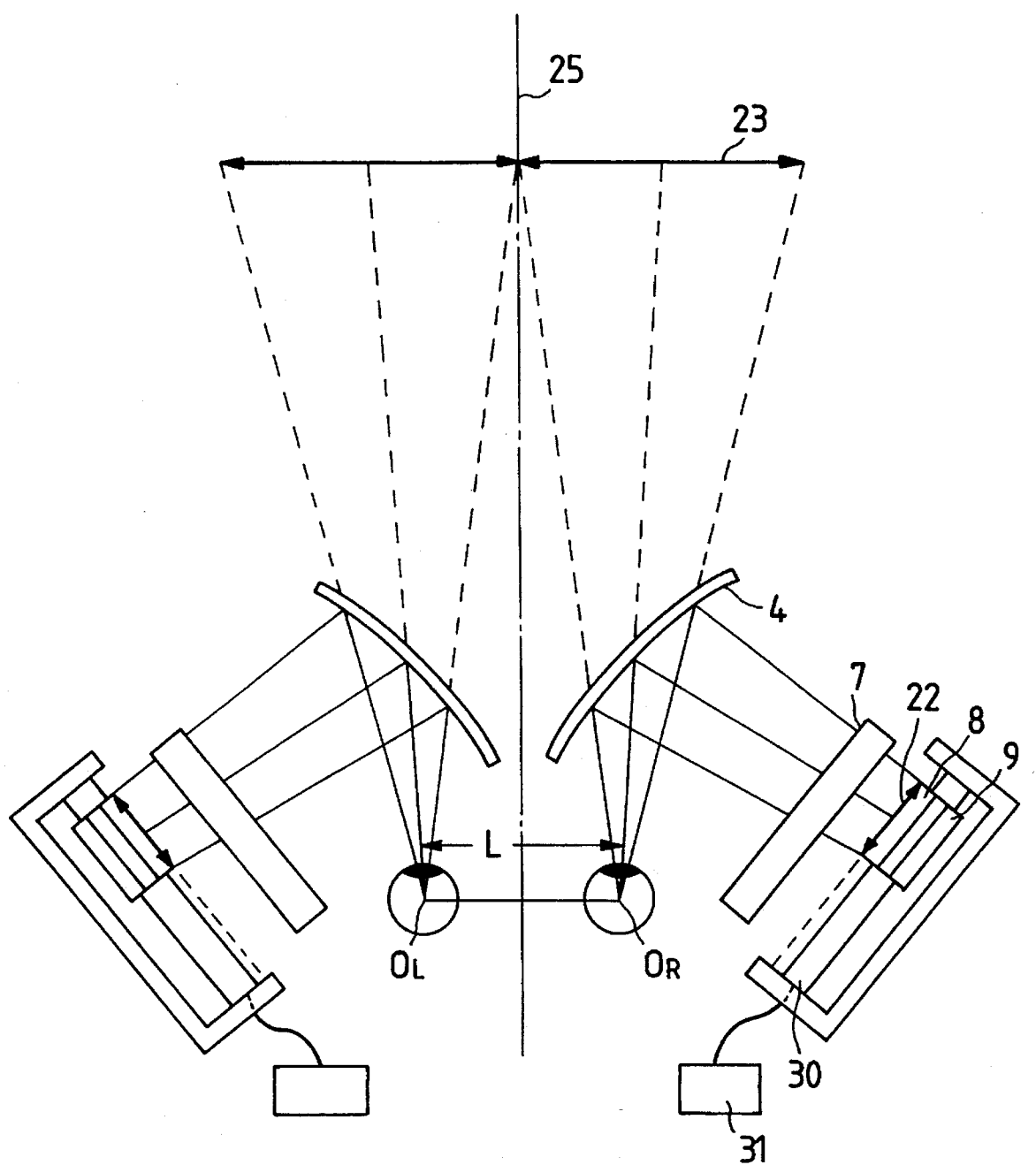
FIG. 18 is a view illustrating an optical layout for performing a panoramic display in the third embodiment.

Next, a mode of displaying the panoramic image by the present apparatus will be explained with reference to FIG. 18. The construction of the apparatus is substantially the same as that in FIG. 1, and, therefore, FIG. 18 shows a point of modification in terms of the construction of the apparatus in this embodiment. Turning to FIG. 18, the small-sized display unit 8 integral with the illuminating unit 9 is freely movable in the horizontal direction. The display surface always, however, exists on the object plane of the magnifying image forming system shown in FIG. 17. Note that the same elements as those in FIG. 2 are marked with the like numerals and the like, and a repetitive explanation will be omitted in FIG. 18.

In the case of the panoramic image display, the right and left display units move to positions farthest from the viewer. The left edge of the right-eye-oriented virtual image is, as shown in the Figure, contiguous to the right edge of the left-eye-oriented virtual image at the point N on the plane 25. Hence, when presenting the image for the panoramic display as in the first embodiment, it is possible for the viewer to view the continuous panoramic image.

Figure 19:
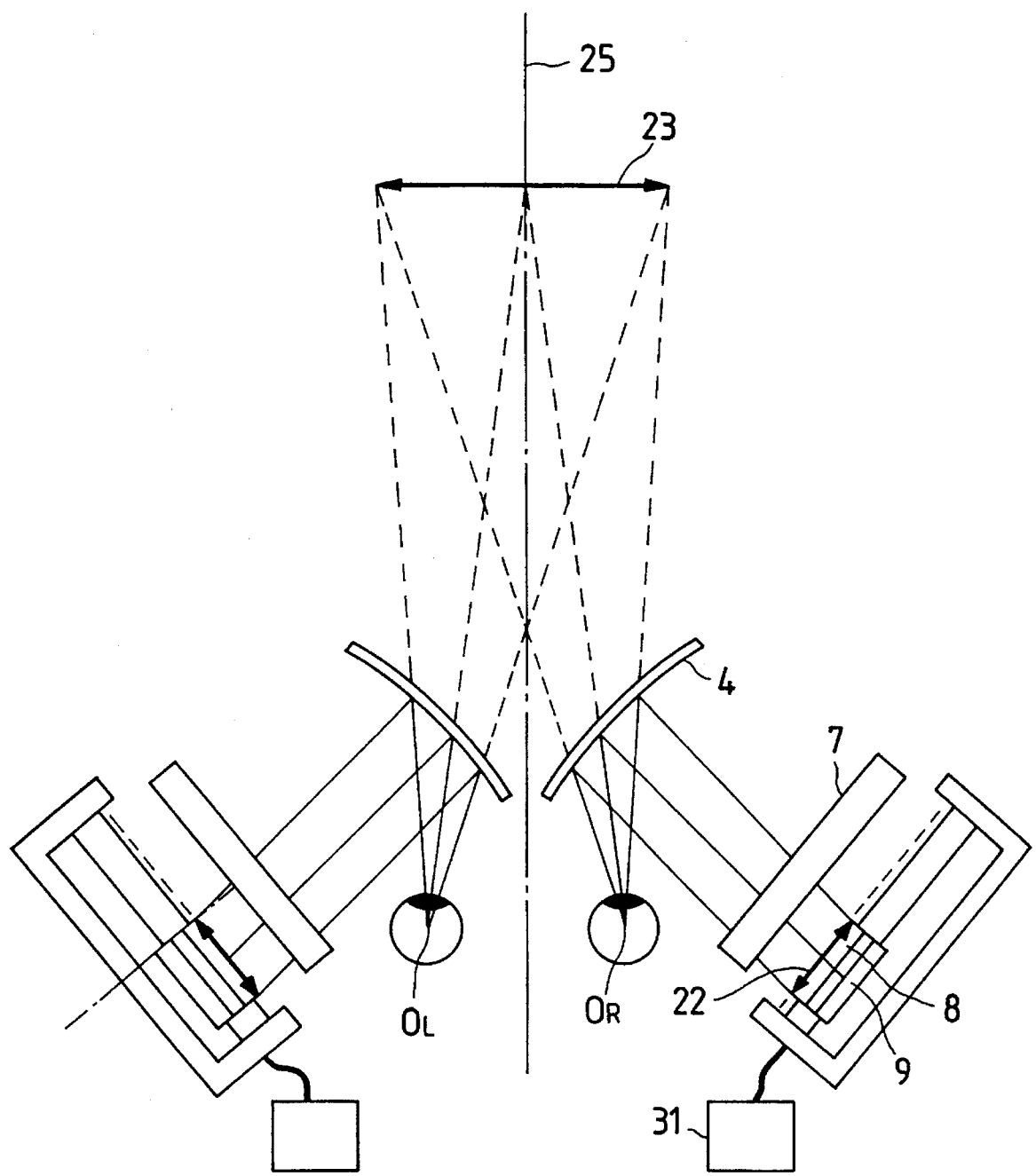
FIG. 19 is a view showing an optical layout for performing a stereoscopic display in the third embodiment.
Figure 20:
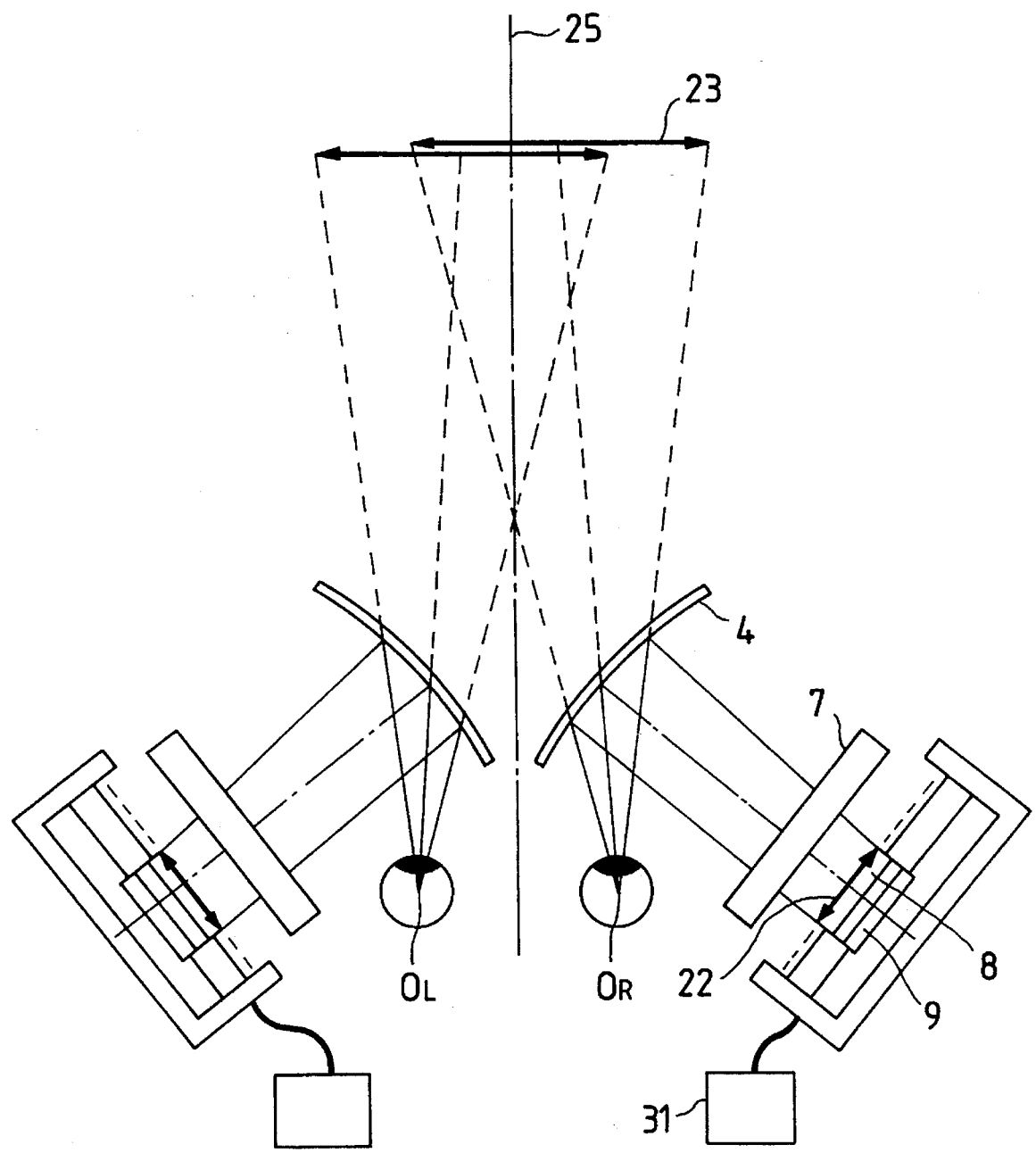
FIG. 20 is a view showing an optical layout for displaying a mixed image in the third embodiment.

Similarly, as illustrated in FIG. 19, the center of the right-eye-oriented virtual image is made coincident with the center of the left-eye-oriented virtual image at the point N on the plane 25, whereby a state of the stereoscopic image display can be readily provided. Alternatively, as illustrated in FIG. 20, a part of the right-eye-oriented virtual image is overlapped with a part of the left-eye-oriented virtual image at the point N on the plane 25, whereby a state of the panoramic and stereoscopic image display can be also easily provided.

The viewer using the present apparatus is capable of switching over the above 3-stage image display state with the aid of the sideway shift quantity adjusting switch (unillustrated) connected to the actuator driving circuit 31. The viewer is also able to freely set the intermediate state at each stage by continuously making the sideway shift quantity change. When performing display switching thereof, as in the first embodiment, the image data displayed on the LCD 8 are, as a matter of course, switched over to those corresponding to respective purposes. Further, in contrast to the first embodiment, when the image data are switched over from the panoramic display to the stereoscopic display, the virtual image positions automatically shift in accordance with the purpose of the image data.

Fixed, incidentally in the Figure, is the relay optical system 7 which covers the entire moving area of the LCD 8. However, down-sizing can be attained by such a construction that the relay optical system 7 moves together with the LCD 8. In addition, the relay optical system 7 or a part thereof is, though the amount of sideways shift on the virtual plane decreases, moved in the horizontal direction, and the image display state can be thereby changed.

Figure 21:
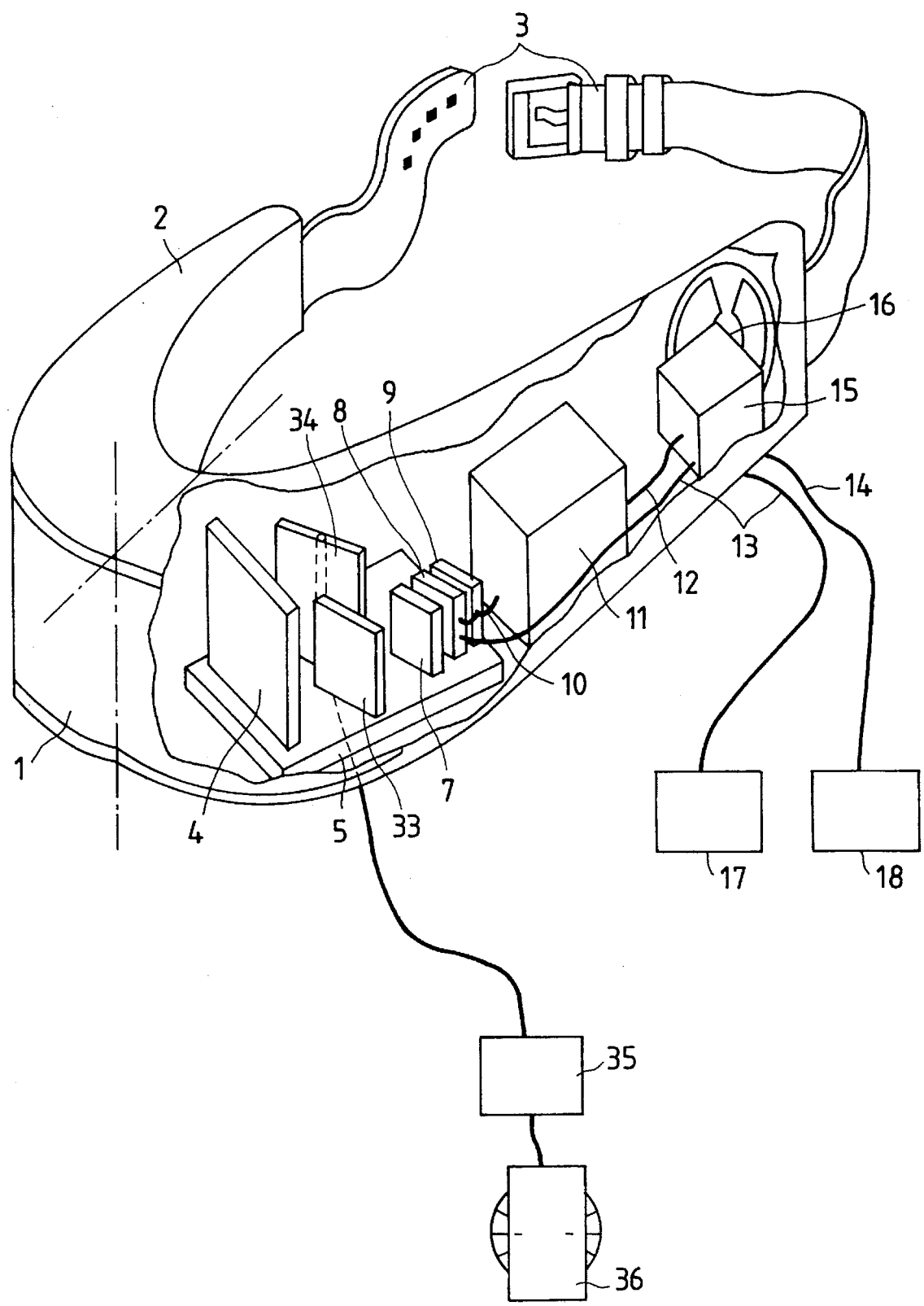
FIG. 21 is a schematic view showing a construction of the apparatus in a fourth embodiment.
Figure 22:
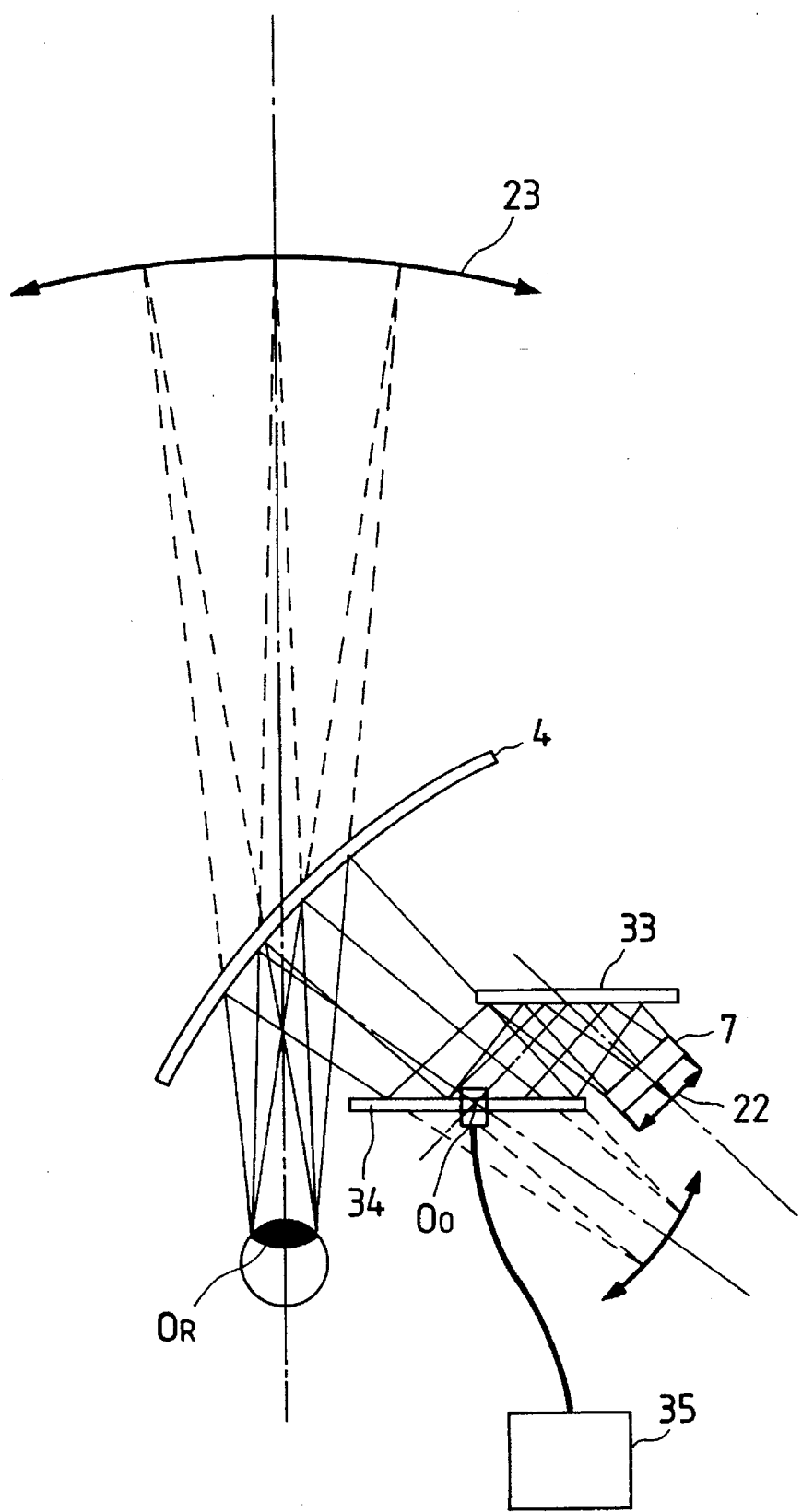
FIG. 22 is a view illustrating an optical layout for effecting a virtual image display in the fourth embodiment.
Figure 23:
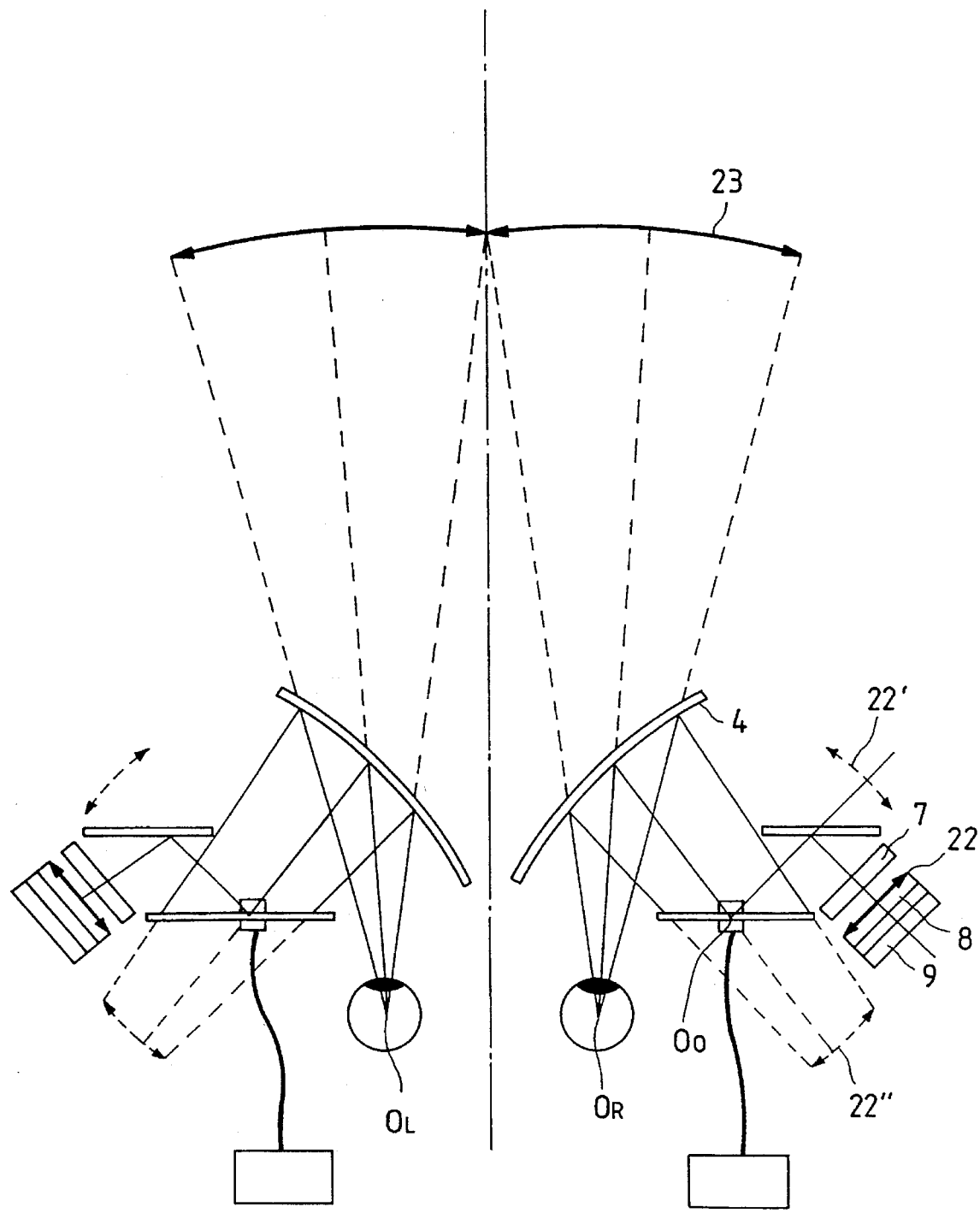
FIG. 23 is a view illustrating an optical layout for effecting a panoramic display in the fourth embodiment.

Fourth Embodiment (FIGS. 21 through 23)

FIG. 21 is a schematic view illustrating a fourth embodiment of the present invention. The principal construction of the displaying apparatus is substantially the same as those in each of the embodiments discussed above. In accordance with the fourth embodiment, however, a movable reflection optical system interposed between the reflection type optical system 4 and the relay optical system 7 works to shift the virtual image forming positions.

FIG. 22 shows a virtual image forming state through the reflection type optical system 4, the relay optical system 7, a mirror 33 and a rotary mirror 34. Referring to FIG. 22, a driving circuit 35 regulates a motion of the rotary mirror 34. The numeral 36 designates a quantity-of rotation adjusting switch. A characteristic of the virtual image forming state in this embodiment is that the object plane serves as a part of a cylindrical plane about a rotation central point $O_o$ of the rotary mirror 34, while the image plane serves as a part of a cylindrical plane about a center $O_R$ of the pupil.

A mode of viewing the panoramic image through the present apparatus will be explained with reference to FIG. 23. The construction of the apparatus is substantially the same as that in FIG. 2, and hence FIG. 23 shows a point of modification in terms of the construction of the apparatus in this embodiment.

The display 22 by the LCD 8 is formed into a first display virtual image 22' through the relay optical system 7 and the mirror 33 as well. A curvature of field is given to this first display virtual image 22' by the relay optical system 7. The first display virtual image 22' is further formed into a second display virtual image 22" by the rotary mirror 34. A center axis of rotation of this rotary mirror 34 is identical with an axis $O_o$. The second display virtual image 22" occupies a part of the above object plane. This virtual image is formed into a virtual image 23 obtained through the reflection type optical system 4.

At this time, a left edge of the right-eye-oriented virtual image 23 is, as shown in the Figure, contiguous to a right edge of the left-eye-oriented virtual image 23 at the point N on the plane 25. As in the first embodiment, it is thus possible for the user to view the continuous panoramic image.

Given further is a state of the stereoscopic image display by making the center of the right-eye-oriented virtual image 23 coincident with the center of the left-eye-oriented virtual image 23 at the point N on the plane 25 while rotating the rotary mirror 34. Alternatively, a part of the right-eye-oriented virtual image 23 is overlapped with a part of the left-eye-oriented virtual image 23 at the point N on the plane 25. A state of the panoramic and stereoscopic mixed image display can be thereby also provided with a facility.

The viewer using the present apparatus is capable of switching over the above 3-stage image display state by use of the quantity-of-rotation adjusting switch 36 connected to the rotary mirror driving circuit 35. The viewer is also able to freely set an intermediate state at each stage by continuously varying the quantity of rotation. When performing the display switchover thereof, as in the first embodiment discussed above, the image data displayed on the LCD 8 are, as a matter of course, changed over to those corresponding to respective purposes. Further, in contrast to the first embodiment, when the image data are changed over from the panoramic display to the stereoscopic display, the virtual image positions automatically are shifted corresponding to the purpose of the image data.

It is apparent that, in this invention, a wide range of different working modes can be formed based on the invention without deviating from the spirit and scope of the invention. This invention is not restricted by its specific working modes except being limited by the appended claims.

What is claimed is:

1. A display apparatus comprising:
    an image displaying means, provided for each of right and left eyes, having:
        a display means for displaying an image;
        an optical system for projecting the beams from said display means toward a pupil of a viewer, so that said viewer is made to observe a virtual image of the image displayed by said display means; and
        a virtual image moving means for rotationally moving said virtual image observed by said viewer in a horizontal direction around said pupil of said viewer
    wherein said virtual image moving means has a means for rotationally moving said image displaying means integral with said display means and said optical system within a horizontal plane by defining the pupil as a center of rotation.

2. The apparatus according to claim 1, wherein said virtual image moving means has an optical deflecting means for deflecting the beams traveling from said display means toward the pupil.

3. The apparatus according to claim 2, wherein said optical deflecting means has a variable angle prism.

4. The apparatus according to claim 1, wherein said virtual image moving means has a means for making said display means move within the horizontal plane.

5. The apparatus according to claim 1, wherein the image displayed on said display means is switched over in accordance with movements of the virtual images.

6. The apparatus according to claim 1, wherein the virtual images are moved in accordance with the image displayed on said display means.

7. A multi-eye image displaying method comprising:
    an image displaying step, performed for each of fight and left eyes, comprising:
        an illuminating step of emitting light by an illumination means;
        a step of displaying an image on a display by using the light in said illuminating step;
        a step of projecting the light from said display toward a pupil of a viewer, so that said viewer is made to observe a virtual image of the image displayed by said display means; and
        a virtual image moving step of rotationally moving said virtual image observed by said viewer in a horizontal direction around said pupil of said viewer
    wherein said virtual image moving step has a step of rotationally moving an element integral with said illumination means, said display and said optical system within a horizontal plane with the pupil serving as a center of rotation.

8. The method according to claim 7, wherein said virtual image moving step has a step of deflecting the beams traveling from said display toward the pupil.

9. The method according to claim 8, wherein said deflecting step has a step of varying a vertical angle of a variable angle prism.

10. The method according to claim 7, wherein said virtual image moving step has a step of moving said display within the horizontal plane.

11. The method according to claim 7, wherein the image displayed on said display is switched over in accordance with movements of the virtual images.

12. The method according to claim 7, wherein-the virtual images are moved in accordance with the image displayed on said display.

* * * * *

UNITED STATES PATENT AND TRADEMARK OFFICE
CERTIFICATE OF CORRECTION

PATENT NO.    : 5,612,709
DATED         : July 16, 1996
INVENTOR(S)   : Toshiyuki Sudo, et al.

It is certified that error appears in the above-identified patent and that said Letters Patent is hereby corrected as shown below:

In claim 12 (page 12, line 43), delete "wherein-the" and insert therefor -- wherein the --

Signed and Sealed this

Twenty-first Day of October 1997

Attest:

BRUCE LEHMAN

Attesting Officer          Commissioner of Patents and Trademarks